United States Patent
Wang et al.

(10) Patent No.: US 10,972,725 B2
(45) Date of Patent: Apr. 6, 2021

(54) METHOD AND APPARATUS FOR INTRA PREDICTION IN VIDEO CODING

(71) Applicant: HUAWEI TECHNOLOGIES CO., LTD., Shenzhen (CN)

(72) Inventors: Biao Wang, Shenzhen (CN); Semih Esenlik, Munich (DE); Anand Meher Kotra, Munich (DE); Han Gao, Munich (DE); Jianle Chen, Santa Clara, CA (US); Zhijie Zhao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/002,741

(22) Filed: Aug. 25, 2020

(65) Prior Publication Data
US 2020/0389644 A1 Dec. 10, 2020

Related U.S. Application Data

(63) Continuation of application No. PCT/CN2019/104254, filed on Sep. 3, 2019.
(Continued)

(51) Int. Cl.
*H04N 19/11* (2014.01)
*H04N 19/176* (2014.01)
(Continued)

(52) U.S. Cl.
CPC .......... *H04N 19/11* (2014.11); *H04N 19/176* (2014.11); *H04N 19/436* (2014.11); *H04N 19/593* (2014.11); *H04N 19/70* (2014.11)

(58) Field of Classification Search
None
See application file for complete search history.

(56) References Cited

U.S. PATENT DOCUMENTS

| 8,326,063 B2 * | 12/2012 | Boon | H04N 19/503 382/238 |
| 8,902,978 B2 * | 12/2014 | Lim | H04N 19/593 375/240.12 |

(Continued)

FOREIGN PATENT DOCUMENTS

| CN | 1674680 A | 9/2005 |
| WO | 2013002556 A2 | 5/2013 |

(Continued)

*Primary Examiner* — Reza Aghevli
(74) *Attorney, Agent, or Firm* — Kilpatrick Townsend & Stockton LLP

(57) ABSTRACT

A decoding method and a decoder for decoding a current block of a video is provided, wherein the decoding method comprises: determining a set of Most Probable Modes (MPMs) for the current block. When at least one condition is satisfied, the set of MPMs includes a Planar mode, a DC mode, a Vertical mode, a Horizontal mode, an intra prediction mode corresponding to a value of the Vertical mode with a first offset, and an intra prediction mode corresponding to the value of the Vertical mode with a second offset. The decoding method further includes obtaining a MPM flag and an MPM index for the current block from a bitstream of the video, and obtaining an intra prediction mode for the current block for reconstructing the current block.

20 Claims, 10 Drawing Sheets

Related U.S. Application Data

(60) Provisional application No. 62/726,419, filed on Sep. 3, 2018.

(51) Int. Cl.
*H04N 19/70* (2014.01)
*H04N 19/593* (2014.01)
*H04N 19/436* (2014.01)

(56) References Cited

U.S. PATENT DOCUMENTS

| | | | |
|---|---|---|---|
| 8,948,259 B2* | 2/2015 | Oh | H04N 19/91 |
| | | | 375/240.12 |
| 9,036,704 B2* | 5/2015 | Park | H04N 19/17 |
| | | | 375/240.13 |
| 9,451,260 B2* | 9/2016 | Seregin | H04N 19/593 |
| 10,477,205 B1* | 11/2019 | Sim | H04N 19/115 |
| 10,602,180 B2* | 3/2020 | Chen | H04N 19/52 |
| 2009/0116760 A1* | 5/2009 | Boon | H04N 19/51 |
| | | | 382/238 |
| 2012/0170652 A1* | 7/2012 | Guo | H04N 19/46 |
| | | | 375/240.12 |
| 2014/0133558 A1* | 5/2014 | Seregin | H04N 19/176 |
| | | | 375/240.12 |
| 2014/0226720 A1* | 8/2014 | Park | H04N 19/17 |
| | | | 375/240.13 |
| 2014/0269914 A1* | 9/2014 | Oh | H04N 19/44 |
| | | | 375/240.12 |
| 2015/0098500 A1* | 4/2015 | Oh | H04N 19/122 |
| | | | 375/240.02 |
| 2015/0222897 A1* | 8/2015 | Park | H04N 19/44 |
| | | | 375/240.02 |
| 2015/0381984 A1* | 12/2015 | Oh | H04N 19/124 |
| | | | 375/240.03 |
| 2017/0374369 A1* | 12/2017 | Chuang | H04N 19/70 |
| 2018/0063532 A1* | 3/2018 | Oh | H04N 19/159 |
| 2018/0160113 A1* | 6/2018 | Jeong | H04N 19/593 |
| 2018/0288410 A1* | 10/2018 | Park | H04N 19/105 |
| 2018/0332284 A1* | 11/2018 | Liu | H04N 19/182 |
| 2019/0116381 A1* | 4/2019 | Lee | H04N 19/105 |
| 2019/0166375 A1* | 5/2019 | Jun | H04N 19/176 |
| 2019/0238840 A1* | 8/2019 | Jang | H04N 19/159 |
| 2019/0379891 A1* | 12/2019 | Moon | H04N 19/46 |
| 2020/0007891 A1* | 1/2020 | Kang | H04N 19/11 |
| 2020/0021805 A1* | 1/2020 | Ko | H04N 19/46 |
| 2020/0021851 A1* | 1/2020 | Zhao | H04N 19/105 |
| 2020/0099928 A1* | 3/2020 | Piao | H04N 19/105 |
| 2020/0137401 A1* | 4/2020 | Kim | H04N 19/619 |
| 2020/0162729 A1* | 5/2020 | Lee | H04N 19/176 |
| 2020/0221116 A1* | 7/2020 | Chen | H04N 19/176 |
| 2020/0260104 A1* | 8/2020 | Piao | H04N 19/117 |
| 2020/0275124 A1* | 8/2020 | Ko | H04N 19/11 |
| 2020/0322601 A1* | 10/2020 | Ko | H04N 19/11 |
| 2020/0336739 A1* | 10/2020 | Choi | H04N 19/167 |
| 2020/0336753 A1* | 10/2020 | Park | H04N 19/132 |
| 2020/0366900 A1* | 11/2020 | Jun | H04N 19/593 |

FOREIGN PATENT DOCUMENTS

| | | |
|---|---|---|
| WO | 2013062193 A1 | 5/2013 |
| WO | 2013064094 A1 | 5/2013 |

* cited by examiner

METHOD AND APPARATUS FOR INTRA PREDICTION IN VIDEO CODING

CROSS-REFERENCE TO RELATED APPLICATIONS

This application is a continuation of International Application No. PCT/CN2019/104254, filed on Sep. 3, 2019, which claims the priority to U.S. Provisional Patent Application No. 62/726,419, filed Sep. 3, 2018. The disclosures of the aforementioned patent applications are hereby incorporated by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes.

The intra mode coding scheme currently described in BMS is considered complex and a disadvantage of non-selected mode set is that the index list is always constant.

SUMMARY

Embodiments of the present application provide apparatuses and methods for decoding according to the independent claims.

Embodiments of the present application provide, for example, an efficient most probable modes (MPM) scheme for intra-prediction.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

A first aspect relates to a method for decoding a current block of a video, wherein the decoding method comprises: obtaining a value of a Most Probable Modes, MPM, flag for the current block from a bitstream; obtaining an MPM index for the current block from the bitstream, when the value of the MPM flag indicates that an intra prediction mode for the current block is an intra prediction mode comprised in an MPM set of intra prediction modes; obtaining a value of the intra prediction mode for the current block, based on the MPM index and the MPM set for the current block; wherein when an intra prediction mode of a left neighboring block of the current block is a Planar mode, and an intra prediction mode of an above neighboring block of the current block is a Planar mode, the MPM set of prediction modes comprises: Planar mode, DC mode, Vertical mode, Horizontal mode, an intra prediction mode corresponding to the Vertical mode with a first offset, and an intra prediction mode corresponding to the Vertical mode with a second offset. The method, may be, for example, performed by a video decoding device.

In a possible implementation form of the method according to the first aspect, wherein when the value of the MPM flag for the current block is 1 and the MPM index for the current block is 0, the intra prediction mode for the current block is Planar mode.

In a possible implementation form of the method according to any preceding implementation of the first aspect or the first aspect, the first offset is −4.

In a possible implementation form of the method according to any preceding implementation of the first aspect or the first aspect, the second offset is +4.

A second aspect relates to a method for decoding a current block of a video, wherein the decoding method comprises: obtaining a value of a Most Probable Modes, MPM, flag for the current block from a bitstream; obtaining an MPM index for the current block from the bitstream, when the value of the MPM flag indicates that an intra prediction mode for the current block is an intra prediction mode comprised in an MPM set of intra prediction modes; obtaining a value of the intra prediction mode for the current block, based on the MPM index and the MPM set for the current block; wherein when an intra prediction mode of a left neighboring block of the current block is a Planar mode, and an intra prediction mode of an above neighboring block of the current block is a DC mode, the MPM set of prediction modes comprises: Planar mode, DC mode, Vertical mode, Horizontal mode, an intra prediction mode corresponding to the Vertical mode with a first offset, and an intra prediction mode corresponding to the Vertical mode with a second offset. The method, may be, for example, performed by a video decoding device.

In a possible implementation form of the method according to the second aspect, wherein when the value of the MPM flag for the current block is 1 and the MPM index for the current block is 0, the intra prediction mode for the current block is Planar mode.

In a possible implementation form of the method according to any preceding implementation of the second aspect or the second aspect, the first offset is −4.

In a possible implementation form of the method according to any preceding implementation of the second aspect or the second aspect, the second offset is +4.

A third aspect relates to a method for decoding a current block of a video, wherein the decoding method comprises: obtaining a value of a Most Probable Modes, MPM, flag for the current block from a bitstream; obtaining an MPM index for the current block from the bitstream, when the value of the MPM flag indicates that an intra prediction mode for the current block is an intra prediction mode comprised in an MPM set of intra prediction modes;

obtaining a value of the intra prediction mode for the current block, based on the MPM index and the MPM set for the current block; wherein when a left neighboring block of the current block is not available, and an intra prediction mode of an above neighboring block of the current block is a Planar mode, the MPM set of prediction modes comprises: Planar mode, DC mode, Vertical mode, Horizontal mode, an intra prediction mode corresponding to the Vertical mode with a first offset, and an intra prediction mode corresponding to the Vertical mode with a second offset. The method, may be, for example, performed by a video decoding device.

In a possible implementation form of the method according to the third aspect, wherein when the value of the MPM flag for the current block is 1 and the MPM index for the current block is 0, the intra prediction mode for the current block is Planar mode.

In a possible implementation form of the method according to any preceding implementation of the third aspect or the third aspect, the first offset is −4.

In a possible implementation form of the method according to any preceding implementation of the third aspect or the third aspect, the second offset is +4.

A fourth aspect relates to a method for decoding a current block of a video, wherein the decoding method comprises: obtaining a value of a Most Probable Modes, MPM, flag for the current block from a bitstream; obtaining an MPM index for the current block from the bitstream, when the value of the MPM flag indicates that an intra prediction mode for the current block is an intra prediction mode comprised in an MPM set of intra prediction modes;

obtaining a value of the intra prediction mode for the current block, based on the MPM index and the MPM set for the current block; wherein when a left neighboring block of the current block is not available, and an above neighboring block of the current block is not available, the MPM set of prediction modes comprises: Planar mode, DC mode, Vertical mode, Horizontal mode, an intra prediction mode corresponding to the Vertical mode with a first offset, and an intra prediction mode corresponding to the Vertical mode with a second offset. The method, may be, for example, performed by a video decoding device.

In a possible implementation form of the method according to the fourth aspect, wherein when the value of the MPM flag for the current block is 1 and the MPM index for the current block is 0, the intra prediction mode for the current block is Planar mode.

In a possible implementation form of the method according to any preceding implementation of the fourth aspect or the fourth aspect, the first offset is −4.

In a possible implementation form of the method according to any preceding implementation of the fourth aspect or the fourth aspect, the second offset is +4.

A fifth aspect relates to a method for decoding a current block of a video, wherein the decoding method comprises: obtaining a value of a Most Probable Modes, MPM, flag for the current block from a bitstream; obtaining an MPM index for the current block from the bitstream, when the value of the MPM flag indicates that an intra prediction mode for the current block is an intra prediction mode comprised in an MPM set of intra prediction modes;

obtaining a value of the intra prediction mode for the current block, based on the MPM index and the MPM set for the current block; wherein when an intra prediction mode of a left neighboring block of the current block is a Planar mode, and an above neighboring block of the current block is not available, the MPM set of prediction modes comprises: Planar mode, DC mode, Vertical mode, Horizontal mode, an intra prediction mode corresponding to the Vertical mode with a first offset, and an intra prediction mode corresponding to the Vertical mode with a second offset. The method, may be, for example, performed by a video decoding device.

In a possible implementation form of the method according to the fifth aspect, wherein when the value of the MPM flag for the current block is 1 and the MPM index for the current block is 0, the intra prediction mode for the current block is Planar mode.

In a possible implementation form of the method according to any preceding implementation of the fifth aspect or the fifth aspect, the first offset is −4.

In a possible implementation form of the method according to any preceding implementation of the fifth aspect or the fifth aspect, the second offset is +4.

A fifth aspect relates to an apparatus for decoding a video stream, which includes a processor and a memory. The memory is storing instructions that cause the processor to perform the method according to a method according to the first to the fourth aspect or any possible implementation or embodiment of the first to the fourth aspect.

A sixth aspect relates to a computer-readable storage medium having stored thereon instructions that when executed cause one or more processors configured to code video data is proposed. The instructions cause the one or more processors to perform a method according to the first to the fourth aspect or any possible implementation or embodiment of the first to the fourth aspect.

According to an seventh aspect, a computer program comprising program code for performing the method according to the first to the fourth aspect or any possible implementation or embodiment of the first to the fourth aspect when executed on a computer is disclosed.

Furthermore, embodiments of the present application provide, for example, an intra mode coding scheme, where a non-selected mode set is adaptive based on the current block properties, e.g. adaptive based on its neighboring blocks' INTRA modes.

Details of one or more embodiments are set forth in the accompanying drawings and the description below. Other features, objects, and advantages will be apparent from the description, drawings, and claims.

BRIEF DESCRIPTION OF DRAWINGS

The following embodiments are described in more detail with reference to the attached figures and drawings, in which.

DETAILED DESCRIPTION OF EMBODIMENTS

Figure 1:
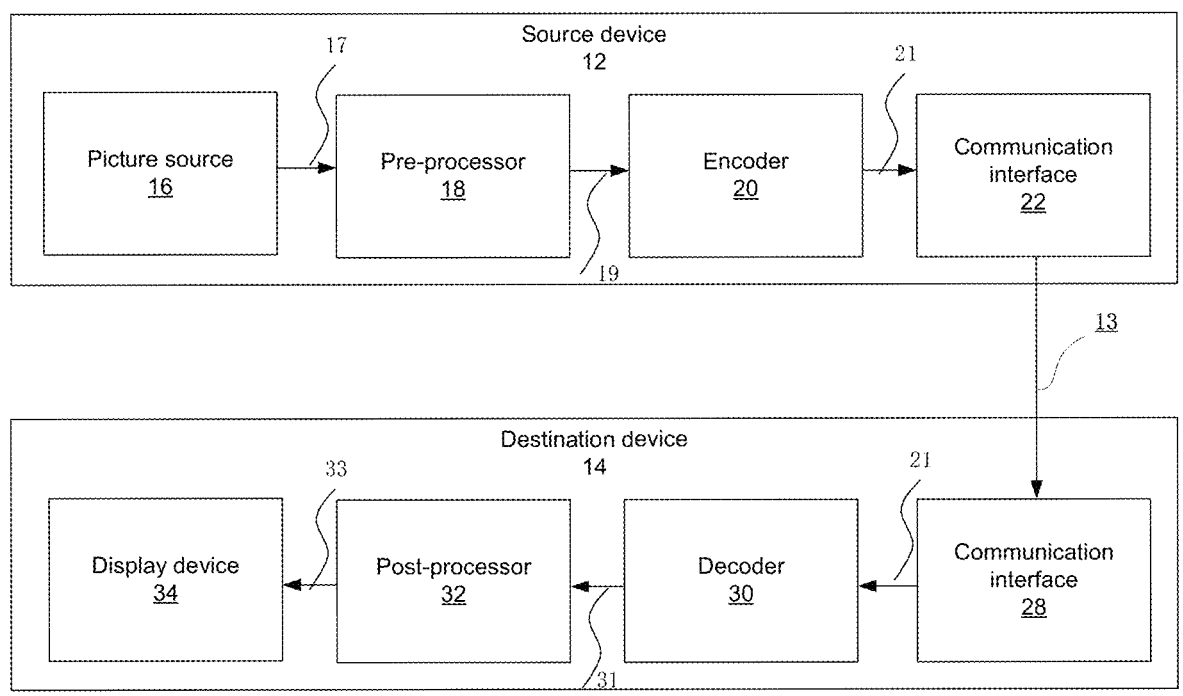
FIG. 1 is a block diagram showing an example of a video coding system configured to implement embodiments of the invention.

Apparatus and method for intra prediction are disclosed. The apparatus and method use a mapping process to simplify the calculation procedure for intra prediction, so as to improve coding efficiency. The scope of protection is defined by the claims.

Definitions of Acronyms & Glossary
CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

In the following description, reference is made to the accompanying drawings, which form part of the disclosure, and in which are shown, by way of illustration, specific aspects in which embodiments of the invention may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

FIG. 1 is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13, e.g. an encoded picture 13, e.g. to a destination device 14 for decoding the encoded data 13. The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors , micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
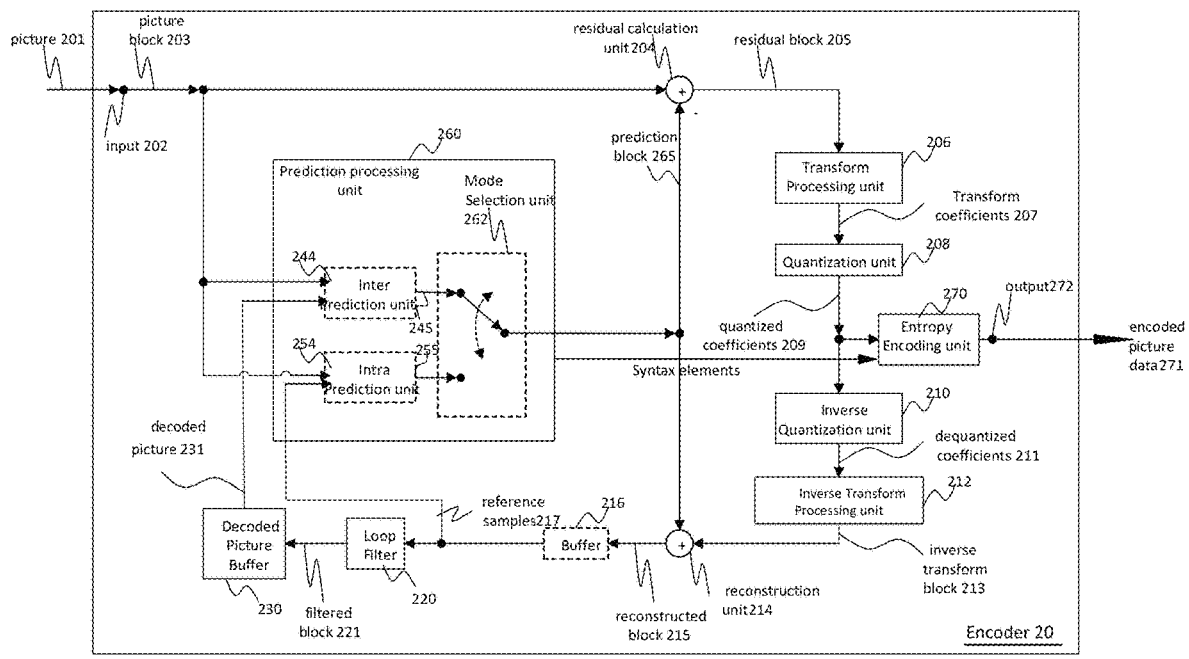
FIG. 2 is a block diagram showing an example of a video encoder configured to implement embodiments of the invention.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
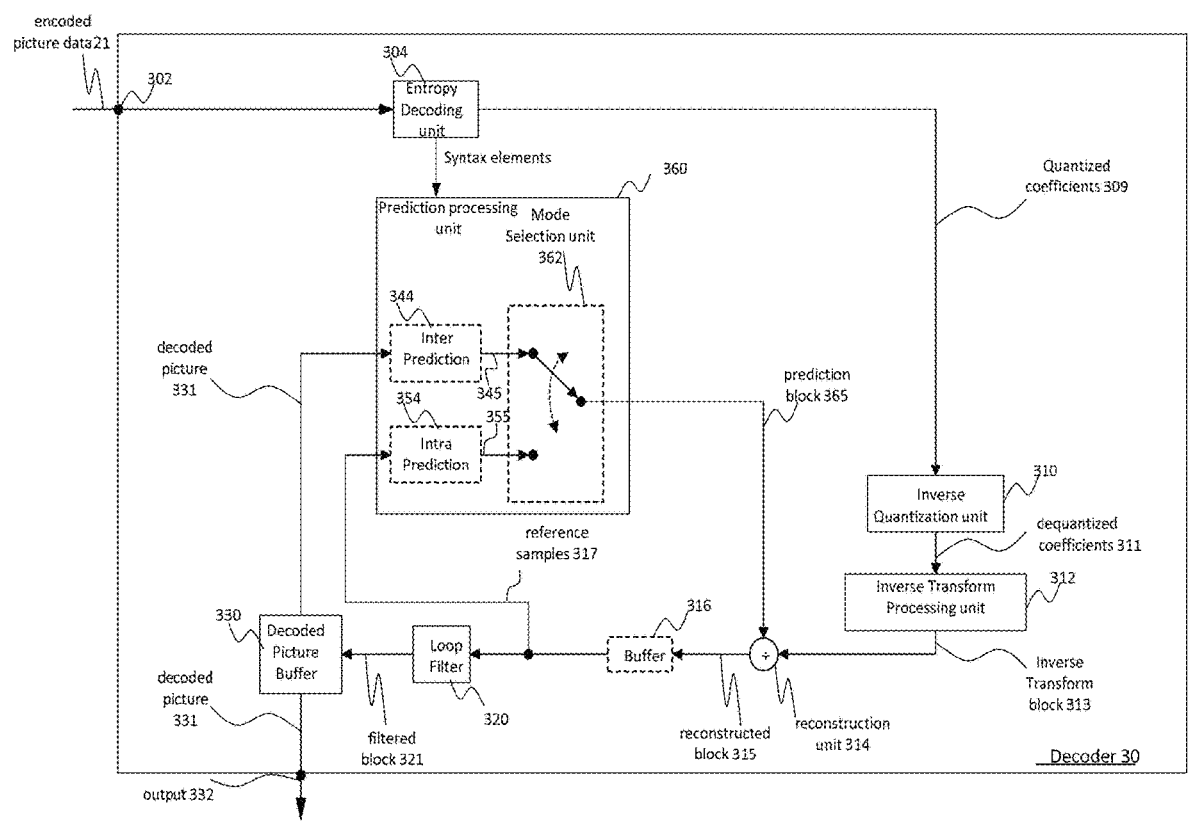
FIG. 3 is a block diagram showing an example structure of a video decoder configured to implement embodiments of the invention.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
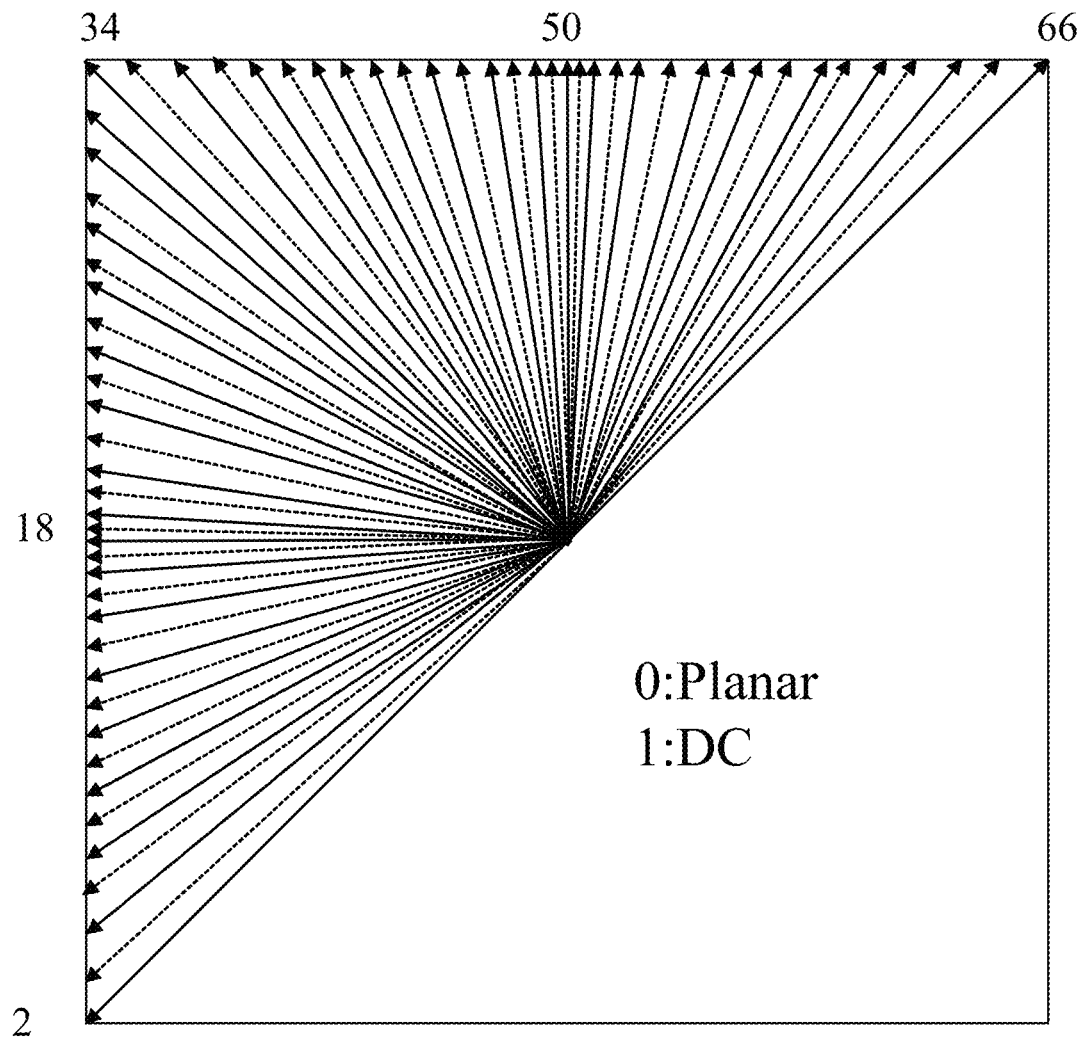
FIG. 4 shows a schematic diagram illustrating 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

The VTM (Versatile Test Model) uses 35 Intra modes whereas the BMS (Benchmark Set) uses 67 Intra modes. To code the 67 intra modes, the current intra mode coding scheme in BMS uses the following method:

To accommodate the increased number of directional Intra modes in BMS, an Intra mode coding method with 6 Most Probable Modes (MPMs) is used. Two major technical aspects are involved.

1) the derivation of 6 MPMs, and
2) entropy coding of 6 MPMs and non-MPMs modes.

In BMS, the modes included into the MPM lists are classified into three groups: Neighbor intra modes, Derived intra modes, and Default intra modes.

Figure 5:
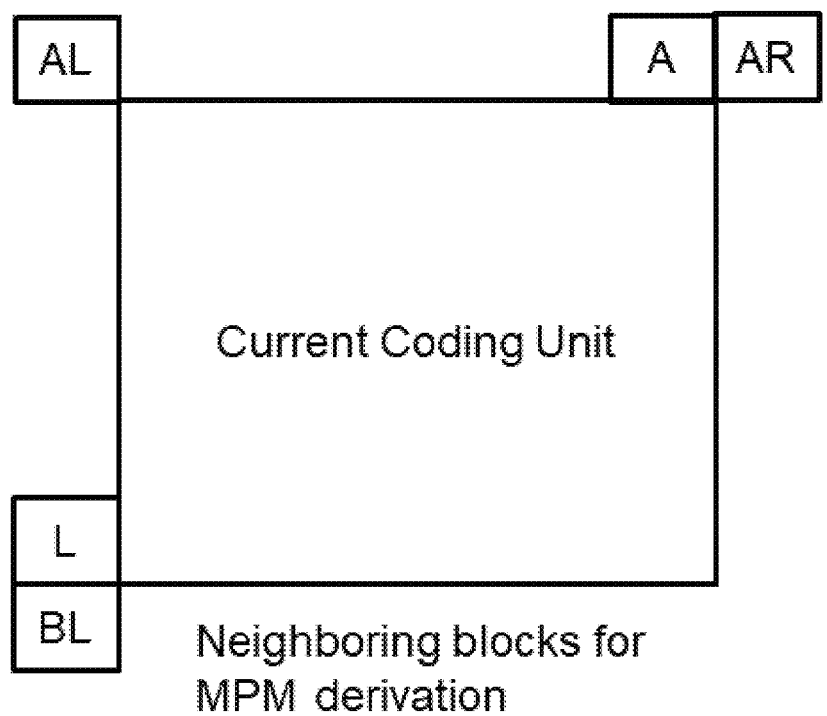
FIG. 5 shows a schematic diagram illustrating neighboring blocks for MPM derivation.
Figure 6:
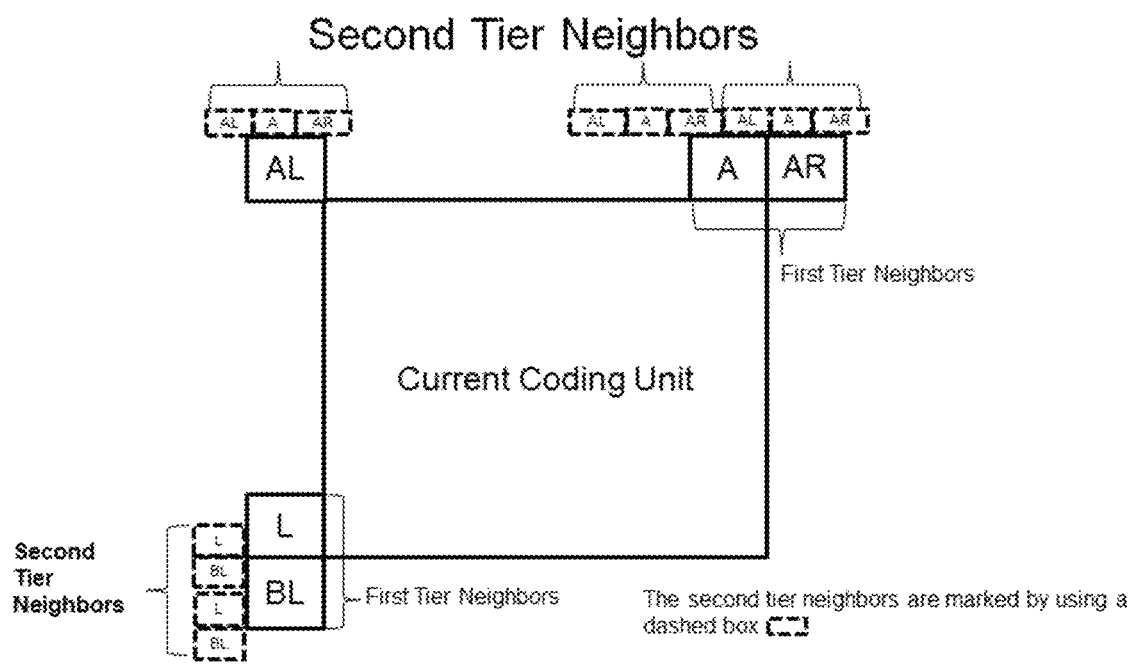
FIG. 6 shows a schematic diagram illustrating second tier neighboring blocks intra modes used for deriving the first three modes in remaining modes list.

Five neighboring intra prediction modes are used to form the MPM list. Those locations of the 5 neighboring blocks are the same as those used in the merge mode, i.e., left (L), above (A), below left (BL), above right (AR), and above left (AL) as shown in FIG. 5. An initial MPM list is formed by inserting 5 neighbor intra modes, planar, and DC modes into the MPM list. A pruning process is used to remove the duplicated modes so that only unique modes are included into the MPM list. The order in which the initial modes are included is left, above, planar, DC, below left, above right, and above left.

If the MPM list is not full (i.e. has less than 6 MPMs candidates in the list), derived modes are added, those intra modes are obtained by adding −1 or +1 to the angular modes which are already included in the MPM list. Derivation is not applied to non-angular modes, i.e. DC or planar.

Finally, if the MPM list is still not complete, the default modes are added in the order of: vertical, horizontal, intra mode 2, and diagonal mode. As a result of this process, a unique list of 6 MPM modes is generated.

For entropy coding of 6 MPMs, a truncated unary binarization of the MPMs is used. The first three bins are coded with contexts which depend on the MPM mode related to the bin currently being signaled. The MPM mode is classified into one of three categories: (a) whether the mode belongs to horizontal (MPM mode is less than or equal to a diagonal direction), (b) vertical (MPM mode greater than the diagonal direction), or (c) non-angular (DC and planar) class. Accordingly, three contexts are used to signal the MPM index.

The coding of the remaining 61 non-MPMs is done as follows. The 61 non-MPMs are firstly divided into two sets: selected modes set and non-selected modes set. The selected modes set contains 16 modes and the rest (45 modes) are assigned to the non-selected modes set. The mode set that the current mode belongs to is indicated in the bitstream with a flag. Then, the mode from the selected set is signaled with a 4-bit fixed-length code, and the mode from the non-selected set is coded with a truncated binary code. The selected modes set is generated by sub-sampling the total 61 non-MPMs with indexes as follows:

Selected modes set={0, 4, 8, 12, 16, 20 . . . 60}
Non-selected modes set={1, 2, 3, 5, 6, 7, 9, 10 . . . 59}

The summary of the different INTRA mode signaling mechanisms is shown in Table 1.

TABLE 1

| Current LUMA Intra mode signaling in BMS | | | |
|---|---|---|---|
| Intra prediction modes | MPM flag | Selected flag | Bin string |
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

In another example, an Intra mode coding method with 3 Most Probable Modes (MPMs) is used. In an example, syntax elements intra_luma_mpm_flag[x0][y0], intra_luma_mpm_idx[x0 ][y0] and intra_luma_mpm_remainder

[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag[x0][y0] is equal to 1, the intra prediction mode is inferred from a neighbouring intra-predicted prediction unit.

Intra prediction for current block (IntraPredModeY[xPb][yPb]) is derived by the following ordered steps:

The neighbouring locations (xNbA, yNbA) and (xNbB, yNbB) are set equal to (xPb−1, yPb) and (xPb, yPb−1), respectively.

For X being replaced by either A or B, the variables candIntraPredModeX are derived as follows:

The availability derivation process for a block is invoked with the location (xCurr, yCurr) set equal to (xPb, yPb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_DC.

The variable availableX is equal to FALSE.
CuPredMode[xNbX][yNbX] is not equal to MODE_INTRA.
X is equal to B and yPb−1 is less than ((yPb>>CtbLog2SizeY)<<CtbLog2SizeY).
Otherwise, candIntraPredModeX is set equal to IntraPredModeY[xNbX][yNbX].
The candModeList[x] with x=0 . . . 2 is derived as follows:
If candIntraPredModeB is equal to candIntraPredModeA, the following applies:
If candIntraPredModeA is less than 2 (i.e., equal to INTRA_PLANAR or INTRA_DC),
candModeList[x] with x=0 . . . 2 is derived as follows:
candModeList[0]=INTRA_PLANAR
candModeList[1]=INTRA_DC
candModeList[2]=INTRA_ANGULAR50
Otherwise, candModeList[x] with x=0 . . . 2 is derived as follows:
candModeList[0]=candIntraPredModeA
candModeList[1]=2+((candIntraPredModeA+61) % 64)
candModeList[2] =2+((candIntraPredModeA−1) % 64)
Otherwise (candIntraPredModeB is not equal to candIntraPredModeA), the following applies:
candModeList[0] and candModeList[1] are derived as follows:
candModeList[0]=candIntraPredModeA
candModeList[1]=candIntraPredModeB
If neither of candModeList[0] and candModeList[1] is equal to INTRA_PLANAR, candModeList[2] is set equal to INTRA_PLANAR,
Otherwise, if neither of candModeList[0] and candModeList[1] is equal to INTRA_DC, candModeList[2] is set equal to INTRA_DC,
Otherwise, candModeList[2] is set equal to INTRA_ANGULAR50.
IntraPredModeY[xPb][yPb] is derived by applying the following procedure:
If intra_luma_mpm_flag[xPb][yPb] is equal to 1, the IntraPredModeY[xPb][ yPb] is set equal to candModeList[intra_luma_mpm_idx[xPb][yPb]].
Otherwise, IntraPredModeY[xPb][yPb] is derived by applying the following ordered steps:
The array candModeList[x], x=0 . . . 2 is modified by the following ordered steps:

When candModeList[0] is greater than candModeList[1], both values are swapped as follows: (candModeList[0], candModeList[1])=Swap(candModeList[0], candModeList[1])
When candModeList[0] is greater than candModeList[2], both values are swapped as follows: (candModeList[0], candModeList[2])=Swap(candModeList[0], candModeList[2])
When candModeList[1] is greater than candModeList[2], both values are swapped as follows: (candModeList[1], candModeList[2])=Swap(candModeList[1], candModeList[2]) (8-11)
IntraPredModeY[xPb][yPb] is derived by the following ordered steps:
IntraPredModeY[xPb][yPb] is set equal to intra_luma_mpm_remainder[xPb][yPb].
For i equal to 0 to 2, inclusive, when IntraPredModeY[xPb][yPb] is greater than or equal to candModeList[i], the value of IntraPredModeY[xPb][yPb] is incremented by one.

In one implementation form of the present application, a frame is same as a picture.

In one aspect of the present disclosure, a method for constructing a Most Probable Mode, MPM, list is disclosed, the method comprises:

determining whether a left block of a current coding block is available or not, if the left block of the current coding block is available, adding an intra prediction mode of the left block into an MPM list;

determining whether an above block of the current coding block is available or not, if the above block of the current coding block is available, adding an intra prediction mode of the above block into the MPM list;

if a planar mode is not comprised in the MPM list, adding the planar mode into the MPM list;

if a DC mode is not comprised in the MPM list, adding the DC mode into the MPM list.

In one implementation form of the present application, if the above block of the current coding block is available and an intra prediction mode of the above block is not comprised in the MPM list, adding the intra prediction mode of the above block into the MPM list.

In one implementation form of the present application, if the above block of the current coding block is available and an intra prediction mode of the above block is comprised in the MPM list, the "adding" performed or we can say the result of the "adding" process doesn't change the MPM list.

In one implementation form of the present application, when the prediction mode of the left block is not an intra prediction mode, the left block of the current coding block is not available.

In one implementation form of the present application, when the current coding block is a coding block located in the left-most side of a frame, the left block of the current coding block is not available.

In one implementation form of the present application, wherein parallel processing is supported and the current coding block is a coding block located in the left-most side of a Tile, the left block of the current coding block is not available.

In one implementation form of the present application, wherein parallel processing is not supported and the current coding block is a coding block located in the left-most side of a Tile but not in the left-most side of a frame, the left block of the current coding block is available.

In one implementation form of the present application, wherein parallel processing is supported and the current coding block is a coding block located in the left-most side of a slice, the left block of the current coding block is not available.

In one implementation form of the present application, wherein parallel processing is not supported and the current coding block is a coding block located in the left-most side of a slice but not in the left-most side of a frame, the left block of the current coding block is available.

In one implementation form of the present application, when the prediction mode of the above block is not an intra prediction mode, the above block of the current coding block is not available.

In one implementation form of the present application, when the current coding block is a coding block located in the top-most side of a frame, the above block of the current coding block is not available.

In one implementation form of the present application, wherein parallel processing is supported and the current coding block is a coding block located in the top-most side of a Tile, the above block of the current coding block is not available.

In one implementation form of the present application, wherein parallel processing is not supported and the current coding block is a coding block located in the top-most side of a Tile but not in the top-most side of a frame, the above block of the current coding block is available.

In one implementation form of the present application, wherein parallel processing is supported and the current coding block is a coding block located in the top-most side of a slice, the above block of the current coding block is not available.

In one implementation form of the present application, wherein parallel processing is not supported and the current coding block is a coding block located in the top-most side of a slice but not in the top-most side of a frame, the above block of the current coding block is available.

In one implementation form of the present application, when line buffer size is constrained and the current coding block is a coding block located in the top-most side of a current CTU, the above block of the current coding block is not available.

In one implementation form of the present application, wherein when the current coding block is a coding block not located in the left-most side of a frame, the left block of the current coding block is available.

In one implementation form of the present application, wherein when the current coding block is a coding block not located in the above-most side of a frame, the above block of the current coding block is available.

In one implementation form of the present application, the method further comprises: if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one implementation form of the present application, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list.

In one implementation form of the present application, the method further comprises a list of angular mode candidates comprising or consisting: a vertical mode (VER_IDX), a horizontal mode (HOR_IDX), an intra mode 2 (2), a vertical diagonal mode (VDIA_IDX) or a diagonal mode (DIA_IDX) into the MPM list; and the method further comprises: iteratively determining according to their order in the list, whether an angular mode of the list is in the MPM list, and if the respective angular mode is not in the MPM list adding the respective angular mode into the MPM list.

In one implementation form of the present application, wherein the constructing of the MPM list starts with the step of determining whether a left block of a current coding block is available or not, e.g. based on an empty MPM list.

In one implementation form of the present application, the method further comprises: if the left block of the current coding block is not available and an other block in the general left direction is available (e.g. BL or AL in FIG. 5), inserting the intra prediction mode of the other block into the MPM list, if the left block is available, not inserting the intra prediction mode of the other block into the MPM list.

In one implementation form of the present application, the method further comprises: if the above block of the current coding block is not available and an other block in the general above direction is available (e.g. AR or AL in FIG. 5), inserting the intra prediction mode of the other block into the MPM list, if the above block is available, not inserting the intra prediction mode of the other block into the MPM list.

In one implementation form of the present application, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list if they are not in the MPM list.

In one implementation form of the present application, the method further comprises: if both the left and the above block of the current coding block are not angular, then further check one more other neighboring blocks (e.g. BL or AL or AR in FIG. 5). If any of them (BL, or AL, or AR) is angular, then use this angular mode as the starting angular mode for the −1+1 derivation process, as described before.

In one implementation form of the present application, a value corresponding to the VER_IDX is 50; a value corresponding to the HOR_IDX is 18; a value corresponding to the VDIA_IDX is 66, and this value may be the largest value in the values corresponding to the angular modes; the value 2 which corresponding to the intra mode 2 may be the smallest value in the values corresponding to the angular modes; a value corresponding to the DIA_IDX is 34.

In one implementation form of the present application, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one implementation form of the present application, the method further comprises:

if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one implementation form of the present application, the method further comprises:

if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a vertical diagonal mode (VDIA_IDX), a diagonal mode (DIA_IDX) or an intra mode 2 (2).

In one implementation form of the present application, the method further comprises:

if the left block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In one implementation form of the present application, the method further comprises:

if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset −4 or an intra prediction mode corresponding to VER_IDX with an offset 4.

In one implementation form of the present application, an intra prediction mode corresponding to VER_IDX with an offset −4 is using the value corresponding to the VER_IDX to add the offset −4 and obtain the value of the corresponded intra prediction mode, for example, as the value of VER_IDX is 50, an intra prediction mode corresponding to VER_IDX with an offset −4 is the intra prediction mode 46, an intra prediction mode corresponding to VER_IDX with an offset 4 is the intra prediction mode 54. The other examples with offset has similar process as this example.

Note that when performing −1 or +1 or other offset values, it might involve a wrap up and wrap down operation, for example, as the value of intra mode (2) is 2 (the smallest value in the values corresponding to the angular modes), then intra mode (2)−1 would be 66 (wrap up case), or as the value of VDIA_IDX is 66 (the biggest value in the values corresponding to the angular modes), then VDIA_IDX+1 would be 2 (wrap down case).

In one implementation form of the present application, the method further comprises:

if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

In one implementation form of the present application, the method further comprises:

if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset 4 or an intra prediction mode corresponding to VER_IDX with an offset −4.

In one implementation form of the present application, the method further comprises:

if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset 4 or an intra prediction mode corresponding to VER_IDX with an offset −4 according to the aforementioned order to the MPM list, when the intra-prediction mode is not comprised in the MPM list, until the quantity of prediction modes is equal to the threshold.

In one implementation form of the present application, the method further comprises:

if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets:

a vertical mode (VER_IDX) (as first intra prediction mode), a vertical diagonal mode (VDIA_IDX), an intra prediction mode corresponding to VER_IDX with an offset −1, and an intra prediction mode corresponding to VER_IDX with an offset 1; or a vertical mode (VER_IDX) (as first intra prediction mode), a vertical diagonal mode (VDIA_IDX), an intra prediction mode corresponding to VER_IDX with an offset −4, and an intra prediction mode corresponding to VER_IDX with an offset 4; or a vertical mode (VER_IDX) (as first intra prediction mode), a vertical diagonal mode (VDIA_IDX), an intra prediction mode corresponding to VDIA_IDX with an offset −4, and an intra prediction mode corresponding to VER_IDX with an offset −1; or a vertical mode (VER_IDX) (as first intra prediction mode), a vertical diagonal mode (VDIA_IDX), an intra prediction mode corresponding to VDIA_IDX with an offset −4, and an intra prediction mode corresponding to VER_IDX with an offset +1; or a vertical mode (VER_IDX) (as first intra prediction mode), a vertical diagonal mode (VDIA_IDX), an intra prediction mode corresponding to VDIA_IDX with an offset −1, and an intra prediction mode corresponding to VER_IDX with an offset −1; or a vertical mode (VER_IDX) (as first intra prediction mode), a vertical diagonal mode (VDIA_IDX), an intra prediction mode corresponding to VDIA_IDX with an offset −1, and an intra prediction mode corresponding to VER_IDX with an offset 1; or a vertical mode (VER_IDX) (as first intra prediction mode), a vertical diagonal mode (VDIA_IDX), an intra prediction mode corresponding to VER_IDX with an offset −1, and an intra prediction mode corresponding to VDIA_IDX with an offset −4; or a vertical mode (VER_IDX) (as first intra prediction mode), a vertical diagonal mode (VDIA_IDX), an intra prediction mode corresponding to VER_IDX with an offset 1, and an intra prediction mode corresponding to VDIA_IDX with an offset −4; or a vertical mode (VER_IDX) (as first intra prediction mode), a vertical diagonal mode (VDIA_IDX), an intra prediction mode corresponding to VER_IDX with an offset −1, and an intra prediction mode corresponding to VDIA_IDX with an offset −1; or a vertical mode (VER_IDX) (as first intra prediction mode), a vertical diagonal mode (VDIA_IDX), an intra prediction mode corresponding to VER_IDX with an offset 1, and an intra prediction mode corresponding to VDIA_IDX with an offset −1.

In one implementation form of the present application, the method further comprises:

if the left block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold;

wherein the set of intra-prediction modes comprises one of the following intra prediction modes sets:

a vertical mode (VER_IDX), a vertical diagonal mode (VDIA_IDX), an intra prediction mode corresponding to VER_IDX with an offset −1, and an intra prediction mode corresponding to VER_IDX with an offset 1; or a vertical mode (VER_IDX), a vertical diagonal mode (VDIA_IDX), an intra prediction mode corresponding to VER_IDX with an offset −4, and an intra prediction mode corresponding to VER_IDX with an offset 4; or a vertical mode (VER_IDX), a vertical diagonal mode (VDIA_IDX), an intra prediction mode corresponding to VDIA_IDX with an offset −4, and an intra prediction mode corresponding to VER_IDX with an offset −1; or a vertical mode (VER_IDX), a vertical diagonal mode (VDIA_IDX), an intra prediction mode corresponding to VDIA_IDX with an offset −4, and an intra prediction mode corresponding to VER_IDX with an offset +1; or a vertical mode (VER_IDX), a vertical diagonal mode (VDIA_IDX), an intra prediction mode corresponding to VDIA_IDX with an offset −1, and an intra prediction mode corresponding to VER_IDX with an offset −1; or a vertical mode (VER_IDX), a vertical diagonal mode (VDIA_IDX), an intra prediction mode corresponding to VDIA_IDX with an offset −1, and an intra prediction mode corresponding to VER_IDX with an offset 1; or a vertical mode (VER_IDX), a vertical diagonal mode (VDIA_IDX), an intra prediction mode corresponding to VER_IDX with an offset −1, and an intra prediction mode corresponding to VDIA_IDX with an offset −4; or a vertical mode (VER_IDX), a vertical diagonal mode (VDIA_IDX), an intra prediction mode corresponding to VER_IDX with an offset 1, and an intra prediction mode corresponding to VDIA_IDX with an offset −4; or a vertical mode (VER_IDX), a vertical diagonal mode (VDIA_IDX), an intra prediction mode corresponding to VER_IDX with an offset −1, and an intra prediction mode corresponding to VDIA_IDX with an offset −1; or a vertical mode (VER_IDX), a vertical diagonal mode (VDIA_IDX), an intra prediction mode corresponding to VER_IDX with an offset 1, and an intra prediction mode corresponding to VDIA_IDX with an offset −1.

In one implementation form of the present application, the method further comprises:

if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a horizontal mode (HOR_IDX) (as first intra prediction mode), an intra mode 2 (2), a diagonal mode (DIA_IDX) or a vertical diagonal mode (VDIA_IDX).

In one implementation form of the present application, the method further comprises:

if a quantity of intra prediction modes in the MPM list is less than a threshold, the above block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In one implementation form of the present application, the method further comprises:

if a quantity of intra prediction modes in the MPM list is less than a threshold, the left block of the current coding block is available and the above block of the current coding block is available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra mode 2 (2), a vertical diagonal mode (VDIA_IDX) or a diagonal mode (DIA_IDX).

In one implementation form of the present application, the method further comprises:

if a quantity of intra prediction modes in the MPM list is less than a threshold, the left block of the current coding block is available and the above block of the current coding block is available, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one implementation form of the present application, the method further comprises:

if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a horizontal mode (HOR_IDX) (as first intra prediction mode), an intra mode 2 (2), a diagonal mode (DIA_IDX) or a vertical diagonal mode (VDIA_IDX).

In one implementation form of the present application, the method further comprises:

if a quantity of intra prediction modes in the MPM list is less than a threshold, the above block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In one implementation form of the present application, the method further comprises:

if a quantity of intra prediction modes in the MPM list is less than a threshold, the left block of the current coding block is available and the above block of the current coding block is available, checking whether a first intra prediction mode of a set of intra-prediction modes is comprised in the MPM list, and adding the first intra-prediction mode to the MPM list if the first intra-prediction mode is not comprised in the MPM list, wherein the set of intra-prediction modes comprises a vertical mode (VER_IDX) (as first intra prediction mode), a horizontal mode (HOR_IDX), an intra prediction mode corresponding to VER_IDX with an offset −4 or an intra prediction mode corresponding to VER_IDX with an offset 4.

In one implementation form of the present application, the method further comprises:

if a quantity of intra prediction modes in the MPM list is less than a threshold, the left block of the current coding block is available and the above block of the current coding block is available, adding iteratively an intra-prediction mode of a set of intra-prediction modes comprises a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

In one implementation form of the present application, the method further comprises:

if the above block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets:

a horizontal mode (HOR_IDX) (as first intra prediction mode), an intra mode 2 (2), an intra prediction mode corresponding to HOR_IDX with an offset −1, and an intra prediction mode corresponding to HOR_IDX with an offset 1; or a horizontal mode (HOR_IDX) (as first intra prediction mode), an intra mode 2 (2), an intra prediction mode corresponding to HOR_IDX with an offset −4, and HOR_IDX add an offset 4; or a horizontal mode (HOR_IDX) (as first intra prediction mode), an intra mode 2 (2), an intra prediction mode corresponding to an intra mode 2 (2) with an offset 4, and an intra prediction mode corresponding to HOR_IDX with an offset −1; or a horizontal mode (HOR_IDX) (as first intra prediction mode), an intra mode 2 (2), an intra prediction mode corresponding to an intra mode 2 (2) with an offset 4, and an intra prediction mode corresponding to HOR_IDX with an offset 1; or a horizontal mode (HOR_IDX) (as first intra prediction mode), an intra mode 2 (2), an intra prediction mode corresponding to an intra mode 2 (2) with an offset 1, and an intra prediction mode corresponding to HOR_IDX with an offset −1; or a horizontal mode (HOR_IDX) (as first intra prediction mode), an intra mode 2 (2), an intra prediction mode corresponding to an intra mode 2 (2) with an offset 1, and an intra prediction mode corresponding to HOR_IDX with an offset 1; or a horizontal mode (HOR_IDX) (as first intra prediction mode), an intra mode 2 (2), an intra prediction mode corresponding to HOR_IDX with an offset −1, and an intra prediction mode corresponding to an intra mode 2 (2) with an offset 4; or a horizontal mode (HOR_IDX) (as first intra prediction mode), an intra mode 2 (2), an intra prediction mode corresponding to HOR_IDX with an offset 1, and an intra prediction mode corresponding to an intra mode 2 (2) with an offset 4; or a horizontal mode (HOR_IDX) (as first intra prediction mode), an intra mode 2 (2), an intra prediction mode corresponding to HOR_IDX with an offset −1, and an intra prediction mode corresponding to an intra mode 2 (2) with an offset 1; or a horizontal mode (HOR_IDX) (as first intra prediction mode), an intra mode 2 (2), an intra prediction mode corresponding to HOR_IDX with an offset 1, and an intra prediction mode corresponding to an intra mode 2 (2) with an offset 1.

In one implementation form of the present application, the method further comprises:

if the above block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold; wherein the set of intra-prediction modes comprising one of the following intra prediction modes sets:

a horizontal mode (HOR_IDX), an intra mode 2 (2), an intra prediction mode corresponding to HOR_IDX with an offset −1, and an intra prediction mode corresponding to HOR_IDX with an offset 1; or a horizontal mode (HOR_IDX), an intra mode 2 (2), an intra prediction mode corresponding to HOR_IDX with an offset −4, and HOR_IDX add an offset 4; or a horizontal mode (HOR_IDX), an intra mode 2 (2), an intra prediction mode corresponding to an intra mode 2 (2) with an offset 4, and an intra prediction mode corresponding to HOR_IDX with an offset −1; or a horizontal mode (HOR_IDX), an intra mode 2 (2), an intra prediction mode corresponding to an intra mode 2 (2) with an offset 4, and an intra prediction mode corresponding to HOR_IDX with an offset 1; or a horizontal mode (HOR_IDX), an intra mode 2 (2), an intra prediction mode corresponding to an intra mode 2 (2) with an offset 1, and an intra prediction mode corresponding to HOR_IDX with an offset −1; or a horizontal mode (HOR_IDX), an intra mode 2 (2), an intra prediction mode corresponding to an intra mode 2 (2) with an offset 1, and an intra prediction mode corresponding to HOR_IDX with an offset 1; or a horizontal mode (HOR_IDX), an intra mode 2 (2), an intra prediction mode corresponding to HOR_IDX with an offset −1, and an intra prediction mode corresponding to an intra mode 2 (2) with an offset 4; or a horizontal mode (HOR_IDX), an intra mode 2 (2), an intra prediction mode corresponding to HOR_IDX with an offset 1, and an intra prediction mode corresponding to an intra mode 2 (2) with an offset 4; or a horizontal mode (HOR_IDX), an intra mode 2 (2), an intra prediction mode corresponding to HOR_IDX with an offset −1, and an intra prediction mode corresponding to an intra mode 2 (2) with an offset 1; or a horizontal mode (HOR_IDX), an intra mode 2 (2), an intra prediction mode corresponding to HOR_IDX with an offset 1, and an intra prediction mode corresponding to an intra mode 2 (2) with an offset 1.

In one implementation form of the present application, the method further comprises: if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In one implementation form of the present application, the method further comprises:

if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a vertical diagonal mode (VDIA_IDX), a diagonal mode (DIA_IDX) or an intra mode 2 (2).

In one implementation form of the present application, the method further comprises:

if the left block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In one implementation form of the present application, it could be understood that adding an intra prediction mode into the MPM list is adding a value corresponding to the intra prediction mode into the MPM list.

In one implementation form of the present application, the threshold is 6.

In one implementation form of the present application, the method further comprises: if the left block of the current coding block is available and the intra prediction mode of the left block is an angular mode, adding an offset to the prediction mode of the left block to obtain a new prediction mode, if the new prediction mode is not in the MPM list, adding the new prediction mode into the MPM list.

In an example, the offset is −1; in another example, the offset is 1. In some examples, the offset may be 2 or −2.

In one implementation of the present application, the method further comprises: if the above block of the current coding block is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

In an example, the offset is −1; in another example, the offset is 1. In some examples, the offset may be 2 or −2.

In one aspect of the present application, an encoder comprises processing circuitry for carrying out the above methods.

In one aspect of the present application, a decoder comprises processing circuitry for carrying out the above methods.

In one aspect of the present application, a computer program product comprises a program code for performing the above methods.

In one aspect of the present application, a decoder for constructing a Most Probable Mode, MPM, list, comprising: one or more processors; and a non-transitory computer-readable storage medium coupled to the processors and storing programming for execution by the processors, wherein the programming, when executed by the processors, configures the decoder to carry out the above methods.

In one aspect of the present application, an encoder for construct a Most Probable Mode, MPM, list, comprises: one or more processors; and a non-transitory computer-readable storage medium coupled to the processors and storing programming for execution by the processors, wherein the programming, when executed by the processors, configures the encoder to carry out the above methods.

In an example,

Step one: determining whether a left block of a current coding block is available or not.

If the left block of the current coding block is available, adding an intra prediction mode of the left block into an MPM list. The MPM list may be an empty list, if the left block of the current coding block is available, an intra prediction mode of the left block is added into the MPM list, then the MPM list includes one intra prediction mode; and if the left block of the current coding block is not available, the MPM list still is an empty list after step one.

Step two: determining whether an above block of the current coding block is available or not.

If the above block of the current coding block is available, adding an intra prediction mode of the above block into the MPM list. The MPM list may be includes the intra prediction mode of the left block or still an empty list.

If the above block of the current coding block is available and the MPM list includes the intra prediction mode of the left block, it is further to determine whether the intra prediction mode of the above block is same as the intra prediction mode of the left block, if they are same, the result of the step "adding an intra prediction mode of the above block into the MPM list" don't change the quantity of intra prediction mode in the MPM list, the MPM list only includes one intra prediction mode; if the intra prediction mode of the above block is not same as the intra prediction mode of the left block, adding the intra prediction mode of the above block into the MPM list and then the MPM list includes two intra prediction modes.

If the above block of the current coding block is available and the MPM list still is an empty list, adding the intra prediction mode of the above block into the MPM list, the MPM list includes only one intra prediction mode.

If the above block of the current coding block is not available and the MPM list includes the intra prediction mode of the left block, the MPM list will still only includes the intra prediction mode of the left block.

If the above block of the current coding block is not available and the MPM list still is an empty list, the MPM list will still be an empty list.

Step three: if a planar mode is not in the MPM list, adding the planar mode into the MPM list.

If after step two, the MPM list doesn't include a planar mode, then adding the planar mode into the MPM list.

If both the intra prediction mode of the left block and the intra prediction mode of the above block are not available, or the available intra prediction mode is not the planar mode, the MPM list doesn't include a planar mode.

If a planar mode is in the MPM list, go to step four.

Step four: if a DC mode is not in the MPM list, adding the DC mode into the MPM list.

If after step two or step three, the MPM list doesn't include a DC mode, then adding the DC mode into the MPM list.

If both the intra prediction mode of the left block and the intra prediction mode of the above block are not available, or the available intra prediction mode is not the DC mode, the MPM list doesn't include a DC mode.

If a DC mode is in the MPM list, go to the following steps or finish construct the MPM list.

In one implementation form of the present application, in each step, the process to add a prediction mode into the MPM list need to make sure no duplicated prediction modes in the MPM list. Hence, if an intra prediction mode need to be added into the MPM list is same as one intra prediction mode in the MPM list, the "adding" process does not change the MPM list or the "adding" process is not performed.

In one implementation form of the present application, after step 4, only if angular mode exist, then do angular −1, angular +1.

In an example, if a quantity of intra prediction modes in the MPM list is six. After step four, there are three cases regarding the length of MPM:

Case 1: MPM length is 2: → both L and A not angular(>DC) or not available, only planar and DC in → use all four default modes.

Case 2: MPM length is 3: → one of L and A is angular, or they are same angular. → use one default mode.

Case 3: MPM length is 4: → both L and A is angular and they are different → no default mode is used, as at least one of L−1, L+1, will be added. If one of them is a duplication of above (diff(L−A)=1), then at least one of A−1 and A+1 will be further inserted.

In one implementation form of the present application, the method further comprises: if the left block of the current coding block is available and the intra prediction mode of the left block is an angular mode, adding an offset to the prediction mode of the left block to obtain a new prediction mode, if the new prediction mode is not in the MPM list, adding the new prediction mode into the MPM list.

In another example, the MPM list includes six intra prediction modes, as the above four steps only could obtain four intra prediction modes in largest case. The method further comprises:

Step five: if the left block of the current coding block is available and the intra prediction mode of the left block is an angular mode, adding an offset to the prediction mode of the left block to obtain a new prediction mode, and if the new prediction mode is not in the MPM list, adding the new prediction mode into the MPM list.

For example, if the left block of the current coding block is angular mode 27 (a value corresponding to this angular intra prediction mode is 27), and the MPM list after the above four steps is (27, 15, 0, 1). Adding an offset to the prediction mode of the left block to obtain a new prediction mode, if the new prediction mode is not in the MPM list, adding the new prediction mode into the MPM list. In an example, the offset is −1, so the new prediction mode is 26 and an updated MPM list is (27, 15, 0, 1, 26). In another example, the offset is 1, so the new prediction mode is 28 and an updated MPM list is (27, 15, 0, 1, 28). In another example, step five could adding two offsets to the intra prediction mode of the left block, first add −1 and then add 1 or first add 1 and then add −1, so the updated MPM list may be (27, 15, 0, 1, 26, 28) or (27, 15, 0, 1, 28, 26).

After step five, check whether the MPM list is full (If a quantity of intra prediction modes in the MPM list is equal to a threshold, for example, the threshold is 6, then the MPM list is full. If a quantity of intra prediction modes in the MPM list is less than a threshold, then the MPM list is not full). If the MPM list is full, finish construct the MPM list; if the MPM list is not full, go to the following steps.

And if the left block of the current coding block is not available, step five is not performed and go to following steps.

Note that when adding an offset (for example, −1 or +1) to an angular prediction mode, it might involve a wrap up and wrap down operation, for example, If an angular prediction mode angularLeft is 2, then angularLeft−1 would be 66 (wrap up case), or if angularLeft is 66, then angularLeft+1 would be 2 (wrap down case).

In one implementation form of the present application, the method further comprises: if the above block of the current coding block is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

In an example, the method further comprises:

Step six: if the above block of the current coding block is available and the intra prediction mode of the above block is an angular mode, adding an offset to the prediction mode of the above block to obtain an above-offset prediction mode, and if the above-offset prediction mode is not in the MPM list, adding the new prediction mode into the MPM list.

For example, if the above block of the current coding block is angular mode 26 (a value corresponding to this angular intra prediction mode is 26), and the MPM list after the above five steps is (27, 26, 0, 1, 28). Adding an offset to the prediction mode of the left block to obtain an above-offset prediction mode, if the above-offset prediction mode is not in the MPM list, adding the above-offset prediction mode into the MPM list. In an example, the offset is −1, so the above-offset prediction mode is 25 and an updated MPM list is (27, 26, 0, 1, 28, 25). In another example, the offset is 1, so the above-offset prediction mode is 27 and the insertion of above-offset mode 27 is blocked, since mode 27 has been inserted. In another example, step six could add two offsets to the intra prediction mode of the above block, first add −1 and then add 1 or first add 1 and then add −1, if the MPM list is still not full after added one offset.

And if the above block of the current coding block is not available, step six is not performed and go to following steps. After step six, check whether the MPM list is full (a quantity of intra prediction modes in the MPM list is equal to 6). If the MPM list is full, finish construct the MPM list; if the MPM list is not full (a quantity of intra prediction modes in the MPM list is less than 6), go to the following steps.

In one implementation form of the present application, the method further comprises: if a quantity of intra prediction modes in the MPM list is less than a threshold(for example, the threshold is 6), using a default list to construct the MPM list.

In an example, if a quantity of intra prediction modes in the MPM list is less than a threshold, a default list comprises a vertical mode (VER_IDX), a horizontal mode (HOR_IDX), an intra mode 2 (2), a vertical diagonal mode (VDIA_IDX) or a diagonal mode (DIA_IDX).

In an example, if a quantity of intra prediction modes in the MPM list is less than a threshold, a default list comprises a vertical mode (VER_IDX), a horizontal mode (HOR_IDX), a VER_IDX add an offset −4 or a VER_IDX add an offset 4.

In an example, if a quantity of intra prediction modes in the MPM list is less than a threshold, a default list comprises a vertical mode (VER_IDX), a horizontal mode (HOR_IDX), a VER_IDX add an offset 4 or a VER_IDX add an offset −4.

In an example, if the left block of the current coding block is not available and a quantity of intra prediction modes in the MPM list is less than a threshold, a default list comprises:
vertical mode (VER_IDX), vertical diagonal mode (VDIA_IDX), diagonal mode (DIA_IDX) or intra mode 2 (2); or
vertical mode (VER_IDX), vertical diagonal mode (VDIA_IDX), VER_IDX add an offset −1, and VER_IDX add an offset 1; or
vertical modes (VER_IDX), vertical diagonal mode (VDIA_IDX), VER_IDX add an offset −4, and VER_IDX add an offset 4; or
vertical modes (VER_IDX), vertical diagonal mode (VDIA_IDX), VDIA_IDX add an offset −4, and VER_IDX add an offset −1; or
vertical modes (VER_IDX), vertical diagonal mode (VDIA_IDX), VDIA_IDX add an offset −4, and VER_IDX add an offset +1; or
vertical modes (VER_IDX), vertical diagonal mode (VDIA_IDX), VDIA_IDX add an offset −1, and VER_IDX add an offset −1; or
vertical modes (VER_IDX), vertical diagonal mode (VDIA_IDX), VDIA_IDX add an offset −1, and VER_IDX add an offset 1; or
vertical modes (VER_IDX), vertical diagonal mode (VDIA_IDX), VER_IDX add an offset −1, and VDIA_IDX add an offset −4; or
vertical modes (VER_IDX), vertical diagonal mode (VDIA_IDX), VER_IDX add an offset 1, and VDIA_IDX add an offset −4; or
vertical modes (VER_IDX), vertical diagonal mode (VDIA_IDX), VER_IDX add an offset −1, and VDIA_IDX add an offset −1; or
vertical modes (VER_IDX), vertical diagonal mode (VDIA_IDX), VER_IDX add an offset 1, and VDIA_IDX add an offset −1.

In an example, if a quantity of intra prediction modes in the MPM list is less than a threshold, the above block of the current coding block is not available, a default list comprises: a horizontal mode (HOR_IDX), an intra mode 2 (2), a diagonal mode (DIA_IDX) or a vertical diagonal mode (VDIA_IDX).

In an example, if a quantity of intra prediction modes in the MPM list is less than a threshold, the left block of the current coding block is available and the above block of the current coding block is available, a default list comprises: a vertical mode (VER_IDX), a horizontal mode (HOR_IDX), an intra mode 2 (2), a vertical diagonal mode (VDIA_IDX) or a diagonal mode (DIA_IDX); or
a vertical mode (VER_IDX), a horizontal mode (HOR_IDX), a VER_IDX add an offset −4 or a VER_IDX add an offset 4; or
a vertical mode (VER_IDX), a horizontal mode (HOR_IDX), a VER_IDX add an offset 4 or a VER_IDX add an offset −4.

In an example, if a quantity of intra prediction modes in the MPM list is less than a threshold and the above block of the current coding block is not available, a default list comprises:
horizontal mode (HOR_IDX), an intra mode 2 (2), HOR_IDX add an offset −1, and HOR_IDX add an offset 1; or
horizontal modes (HOR_IDX), an intra mode 2 (2), HOR_IDX add an offset −4, and HOR_IDX add an offset 4; or
horizontal modes (HOR_IDX), an intra mode 2 (2), an intra mode 2 (2) add an offset 4, and HOR_IDX add an offset −1; or
horizontal modes (HOR_IDX), an intra mode 2 (2), an intra mode 2 (2) add an offset 4, and HOR_IDX add an offset 1; or
horizontal modes (HOR_IDX), an intra mode 2 (2), an intra mode 2 (2) add an offset 1, and HOR_IDX add an offset −1; or
horizontal modes (HOR_IDX), an intra mode 2 (2), an intra mode 2 (2) add an offset 1, and HOR_IDX add an offset 1; or
horizontal modes (HOR_IDX), an intra mode 2 (2), HOR_IDX add an offset −1, and an intra mode 2 (2) add an offset 4; or
horizontal modes (HOR_IDX), an intra mode 2 (2), HOR_IDX add an offset 1, and an intra mode 2 (2) add an offset 4; or
horizontal modes (HOR_IDX), an intra mode 2 (2), HOR_IDX add an offset −1, and an intra mode 2 (2) add an offset 1; or horizontal modes (HOR_IDX), an intra mode 2 (2), HOR_IDX add an offset 1, and an intra mode 2 (2) add an offset 1.

In one implementation form of the present application, when a left block of the current coding block is not available, an above block of the current coding block may be available or may be not available.

In one implementation form of the present application, when an above block of the current coding block is not available, a left block of the current coding block may be available or may be not available.

In one implementation form of the present application, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list.

In one implementation form of the present application, the method further comprises: if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX).

In one implementation form of the present application, the method further comprises: if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In an example, after step six, if the MPM list is still not full (a quantity of intra prediction modes in the MPM list less than a threshold), adding an intra prediction mode in a default mode list orderly into the MPM list if this mode or these modes are not in the MPM list, iteratively this step until the MPM list is full.

Step seven: adding a vertical mode (VER_IDX), a horizontal mode (HOR_IDX), an intra mode 2 (2), a vertical diagonal mode (VDIA_IDX) or a diagonal mode (DIA_IDX) into the MPM list.

For example, if a vertical mode is not in the MPM list and the MPM list is not full, add the vertical mode into the MPM list, if the MPM list is full after add the vertical mode, finish construct the MPM list.

And if the MPM list is still not full after add the vertical mode, check whether a horizontal mode is in the MPM list. If the horizontal mode is in the MPM list, further to check whether an intra mode 2 is in the MPM list; if the horizontal mode is not in the MPM list, add the horizontal mode into the MPM list. Iteratively this step until the MPM list is full.

In one implementation form of the present application, in Step seven, with the default modes lists, every insertion of default mode to the MPM list shall make sure no duplicated mode is inserted. If the insertion is successful, another check is performed to detect whether the MPM is full. If so, then the MPM construction process terminates; otherwise, continue insertion with other default mode with the specified order.

In one implementation form of the present application, the method further comprises: if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a vertical mode (VER_IDX), a vertical diagonal mode (VDIA_IDX), a diagonal mode (DIA_IDX) or an intra mode 2 (2).

In one implementation form of the present application, the method further comprises: if the left block of the current coding block is not available and a quantity of intra prediction modes in the MPM list is less than a threshold, adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

In an example, after step six, if the MPM list is still not full and the left block of the current coding block is not available, adding intra prediction mode in a default mode list orderly into the MPM list if this mode or these modes are not in the MPM list, iteratively this step until the MPM list is full.

Step seven: adding a vertical mode (VER_IDX), a vertical diagonal mode (VDIA_IDX), a diagonal mode (DIA_IDX) or an intra mode 2 (2) into the MPM list.

For example, if a vertical mode is not in the MPM list and the MPM list is not full, add the vertical mode into the MPM list, if the MPM list is full after add the vertical mode, finish construct the MPM list.

And if the MPM list is still not full after add the vertical mode, check whether a vertical diagonal mode is in the MPM list. If the vertical diagonal mode is in the MPM list, further to check whether a diagonal mode is in the MPM list; if the diagonal mode is not in the MPM list, add the diagonal mode into the MPM list. Repeat iteratively this step until the MPM list is full.

In one implementation form of the present application, the method further comprises: if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a horizontal mode (HOR_IDX), an intra mode 2 (2), a diagonal mode (DIA_IDX) or a vertical diagonal mode (VDIA_IDX).

In one implementation form of the present application, the method further comprises: if a quantity of intra prediction modes in the MPM list is less than a threshold, the above block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

In an example, after step six, if the MPM list is still not full, the above block of the current coding block is not available, adding intra prediction mode in a default mode list orderly into the MPM list if this mode or these modes are not in the MPM list, iteratively this step until the MPM list is full.

Step seven: adding a horizontal mode (HOR_IDX), an intra mode 2 (2), a diagonal mode (DIA_IDX) or a vertical diagonal mode (VDIA_IDX) into the MPM list.

For example, if a horizontal mode is not in the MPM list and the MPM list is not full, add the horizontal mode into the MPM list, if the MPM list is full after add the horizontal mode, finish construct the MPM list.

And if the MPM list is still not full after add the horizontal mode, check whether an intra mode 2 is in the MPM list. If the intra mode 2 is in the MPM list, further to check whether a diagonal mode is in the MPM list; if the diagonal mode is not in the MPM list, add the diagonal mode into the MPM list. Iteratively repeat this step until the MPM list is full.

In one implementation form of the present application, the method further comprises: if a quantity of intra prediction modes in the MPM list is less than a threshold, the left block of the current coding block is available and the above block of the current coding block is available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX).

In one implementation form of the present application, the method further comprises: if a quantity of intra prediction modes in the MPM list is less than a threshold, the left block of the current coding block is available and the above block of the current coding block is available, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

In an example, after step six, if the MPM list is still not full, the left block of the current coding block is available and the above block of the current coding block is also available, adding intra prediction mode in a default mode list into the MPM list if this mode or these modes are not in the MPM list, iteratively this step until the MPM list is full.

Step seven: adding a vertical mode (VER_IDX), a horizontal mode (HOR_IDX), an intra mode 2 (2), a vertical diagonal mode (VDIA_IDX) or a diagonal mode (DIA_IDX) into the MPM list.

For example, if a vertical mode is not in the MPM list and the MPM list is not full, add the vertical mode into the MPM list, if the MPM list is full after add the vertical mode, finish construct the MPM list.

And if the MPM list is still not full after add the vertical mode, check whether a horizontal mode is in the MPM list. If the horizontal mode is in the MPM list, further to check whether an intra mode 2 is in the MPM list; if the intra mode 2 is not in the MPM list, add the intra mode 2 into the MPM list. Iteratively this step until the MPM list is full.

In one implementation form of the present application, the method further comprises: adding a vertical mode (VER_IDX), a horizontal mode (HOR_IDX), a VER_IDX add an offset −4 or a VER_IDX add an offset 4 into the MPM list.

In one implementation form of the present application, the method further comprises: adding a vertical mode (VER_IDX), a horizontal mode (HOR_IDX), a VER_IDX add an offset 4 or a VER_IDX add an offset −4 into the MPM list.

In an example, after step six, if the MPM list is still not full, adding intra prediction mode in a default mode list into the MPM list if this mode or these modes are not in the MPM list, iteratively this step until the MPM list is full.

Step seven: adding a vertical mode (VER_IDX), a horizontal mode (HOR_IDX), a VER_IDX add an offset −4 or a VER_IDX add an offset 4 into the MPM list into the MPM list; or adding a vertical mode (VER_IDX), a horizontal mode (HOR_IDX), a VER_IDX add an offset 4 or a VER_IDX add an offset −4 into the MPM list into the MPM list.

For example, if a vertical mode is not in the MPM list and the MPM list is not full, add the vertical mode into the MPM list, if the MPM list is full after add the vertical mode, finish construct the MPM list.

And if the MPM list is still not full after add the vertical mode, check whether a horizontal mode is in the MPM list. If the horizontal mode is in the MPM list, further to check whether a prediction mode which value is equal to the value of VER_IDX add an offset −4 is in the MPM list; if the prediction mode which value is equal to the value of VER_IDX add an offset −4 is not in the MPM list, add the prediction mode which value is equal to the value of VER_IDX add an offset −4 into the MPM list. Iteratively this step until the MPM list is full.

In an example, after step six, if the MPM list is still not full and the left block of the current coding block is not available, adding intra prediction mode in a default mode list into the MPM list if this mode or these modes are not in the MPM list, iteratively this step until the MPM list is full.

Step seven: adding a vertical mode (VER_IDX), a vertical diagonal mode (VDIA_IDX), a diagonal mode (DIA_IDX) or an intra mode 2 (2) into the MPM list.

For example, if a vertical mode is not in the MPM list and the MPM list is not full, add the vertical mode into the MPM list, if the MPM list is full after add the vertical mode, finish construct the MPM list.

And if the MPM list is still not full after add the vertical mode, check whether a vertical diagonal mode is in the MPM list. If the vertical diagonal mode is in the MPM list, further to check whether a diagonal mode is in the MPM list; if the diagonal mode is not in the MPM list, add the diagonal mode into the MPM list. Iteratively this step until the MPM list is full.

In an example, after step six, if the MPM list is still not full, the above block of the current coding block is not available, adding intra prediction mode in a default mode list into the MPM list if this mode or these modes are not in the MPM list, iteratively this step until the MPM list is full.

Step seven: adding a horizontal mode (HOR_IDX), an intra mode 2 (2), a diagonal mode (DIA_IDX) or a vertical diagonal mode (VDIA_IDX) into the MPM list.

For example, if a horizontal mode is not in the MPM list and the MPM list is not full, add the horizontal mode into the MPM list, if the MPM list is full after add the horizontal mode, finish construct the MPM list.

And if the MPM list is still not full after add the horizontal mode, check whether an intra mode 2 is in the MPM list. If the intra mode 2 is in the MPM list, further to check whether a diagonal mode is in the MPM list; if the diagonal mode is not in the MPM list, add the diagonal mode into the MPM list. Iteratively this step until the MPM list is full.

In an example, after step six, if the MPM list is still not full, the left block of the current coding block is available and the above block of the current coding block is available, adding intra prediction mode in a default mode list into the MPM list if this mode or these modes are not in the MPM list, iteratively this step until the MPM list is full.

Step seven: adding a vertical mode (VER_IDX), a horizontal mode (HOR_IDX), a VER_IDX add an offset −4 or a VER_IDX add an offset 4 into the MPM list.

In an example, pre-defined default modes are provided: namely, a vertical mode (VER_IDX), a horizontal mode (HOR_IDX), an intra mode 2 (2), a vertical diagonal mode (VDIA_IDX) or a diagonal mode (DIA_IDX), to construct MPM list if it is not full. Two additional approaches regarding these defaults modes are proposed. They are adaptive default approach and changed default approach.

The approach using adaptive modes considers blocks that locate left-most and top-most of a frame.

For blocks located at the left boundary of a frame, the horizontal mode is unlikely used because the source prediction samples that locate in the left block of the current block do not exist. Also, the modes in general using horizontal modes (i.e. DIA_IDX, mode 2) have a lower chance.

For blocks located at the top boundary of a frame, the vertical mode is unlikely used because the source prediction samples that locate in the above block of the current block do not exist. Also, the modes in general using vertical modes (i.e, VDIA_IDX, DIA_IDX) has a lower chance.

Therefore, the following boundary-aware approach is used:
If the left block of the current coding block doesn't exist, then using following modes in order as the default candidate modes: VER_IDX, VDIA_IDX, DIA_IDX, mode 2.
Otherwise (left block exists):
If the above block of the current coding block doesn't exist, then using following modes in order as the default candidate modes: HOR_IDX, mode 2, DIA_IDX, VDIA_IDX.
Otherwise (above block exists), use the normal default modes: VER_IDX, HOR_IDX, an intra mode 2 (2), VDIA_IDX or DIA_IDX The changed default approach adds the following candidate modes to the MPM list: VER, HOR, VER−4, VER+4. The order of VER−4 and VER+4 can be swapped.

One combination of these two methods can be:
If the left block of the current coding block doesn't exist, then using following modes in order as the default candidate modes: VER_IDX, VDIA_IDX, DIA_IDX, mode 2.
Otherwise (left block exists):
If the above block of the current coding block doesn't exist, then using following modes in order as the default candidate modes: HOR_IDX, mode 2, DIA_IDX, VDIA_IDX.
Otherwise (above block exists), use the changed default modes: VER_IDX, HOR_IDX, VER, HOR, VER−4, VER+4.

In one aspect of the present disclosure, a simplified method to construct the 6-entry MPM list is proposed, comprising: check the availability of current coding unit's left block. The position of the left block is illustrated by FIG.5, wherein the left block is labeled by "L".

The left block is not available if no intra prediction information (i.e. intra prediction mode) can be derived from the left block. It includes the following cases:
The left block is not an intra-predicted block; the left block does not exist, for example, the current block is a coding block located in the left-most side of a frame; If encoder or decoder support parallel processing, the left block might be considered as not existing (or not available) when it is located in different Tiles of or with the current block, i.e. the current coding block locates or is located in the left-most side of a Tile.

In another example, if parallel processing is not supported in an encoder or decoder, the left block might be considered as available when it is located in different Tiles of the current block, i.e. the current coding block locates in the left-most side of a Tile.

If parallel processing is supported in encoder or decoder, the left block might be considered as not existing when it is located in the different Slices with the current block, i.e. the current coding block locates in the left-most side of a slice.

In another example, if parallel processing is not supported in encoder or decoder, the left block might be considered as available when it is located in the different Slices with the current block, i.e. the current coding block locates in the left-most side of a slice.

Otherwise (i.e., left block is available), include the intra prediction mode of the left block in the 6-entry MPM list.

Check the availability of current coding unit's above block. The position of the above block is illustrated by FIG. 5, wherein the above block is labeled by "A".

The above block is not available if no intra prediction information (i.e. intra prediction mode) can be derived from the above block. It includes the following cases:
The above block is not an intra-predicted block.
The above block does not exist. For example, the current block is a coding block located in the top-most side of a frame.

If parallel processing is supported in encoder or decoder, the top block might be considered as not existing if it is located in the different Tiles with the current block, i.e. the current coding block locates in the top-most side of a Tile.

In another example, if parallel processing is not supported in encoder or decoder, the top block might be considered as available if it is located in the different Tiles with the current block, i.e. the current coding block locates in the top-most side of a Tile.

If parallel processing is supported in encoder or decoder, the top block might be considered as not existing if it is located in the different Slices with the current block, i.e. the current coding block locates in the top-most side of a slice.

In another example, if parallel processing is not supported in encoder or decoder, the top block might be considered as available if it is located in the different Slices with the current block, i.e. the current coding block locates in the top-most side of a slice.

If it is needed to constrain line buffer size in encoder or decoder, the top block might be considered as not existing if it is located in the different CTU with the current block, i.e. the current coding block locates in the top-most side of the current CTU.

In an example, if decoder side or encoder side support line buffer restriction, then an above block located on different CTU with the current block CTU is considered as not existing. If not support line buffer restriction, then consider it exists.

Otherwise (i.e., left block is available), include the intra prediction mode of the top block in the 6-entry MPM list.

Check whether planar (PLANAR_IDX=0) mode has been inserted in the MPM list, (i.e. check either intra mode of the left and the top block are planar mode), only if planar mode has not been inserted in the MPM list, then insert the planar mode into the MPM list. Check whether DC (DC_IDX=1) mode has been inserted in the MPM list, (i.e. check either intra modes of the left and the top block are DC mode), only if DC mode has not been inserted in the MPM list, then insert the DC mode into the MPM list.

If the left block is available and if its intra prediction mode is an angular mode, i.e. (mode>DC_IDX, and say mode is angularLeft), get its nearest two angular modes by performing angularLeft−1, angularLeft+1. Note that when performing −1 or +1 it might involve a wrap up and wrap down operation, for example, If angularLeft is 2, then angularLeft−1 would be 66 (wrap up case), or if angularLeft is 66, then angularLeft+1 would be 2 (wrap down case).

If the prediction mode of angularLeft−1 has not been inserted into the MPM list, insert it into the MPM list.

If the prediction mode of angularLeft+1 has not been inserted into the MPM list, inserted it into the MPM list.

If MPM list is not full and if the above block is available and if its intra prediction mode is an angular mode, i.e. (mode>DC_IDX, and say mode is angularAbove), get its nearest two angular modes by performing angularAbove−1, angularAbove+1. Note that when performing −1 or +1 it might involve a wrap up and wrap down operation, in an example, if angularLeft is 2, then angularLeft−1 would be 66 (wrap up case), or if angularLeft is 66, then angularLeft+1 would be 2 (wrap down case).

If the prediction mode of angularAbove−1 has not been inserted into the MPM list, insert it into the MPM list.

If MPM list is not full (for example, a quantity of prediction modes in the MPM list is less than 6) and if the prediction mode of angularAbove+1 has not been inserted into the MPM list, insert it into the MPM list.

If the MPM list is not full, insert the following modes to MPM list until it is full (for example, a quantity of prediction modes in the MPM list is equal to 6):
a vertical mode (VER_IDX),
a horizontal mode (HOR_IDX),
an intra mode 2 (2),
a vertical diagonal mode (VDIA_IDX) or a diagonal mode (DIA_IDX).

Summary of variations of the proposed method:

The availability of left block shall consider both, to support or not to support parallel processing.

The availability of above block shall consider both, to support or not to support parallel processing.

The order to derive the two nearest modes of the left and above block can also be +1 first and then −1.

The last candidate of MPM list can either be VIDA_IDX or DIA_IDX.

The order of insertion can also be Left, above, Planar, DC, and default modes (VER_IDX, HOR_IDX, 2, VDIA_IDX or DIA_IDX).

For the signaling of mpm_idx, truncated unary binarization is used. The first three bins of the mpm_idx are allowed to use three different independent contexts or all the bins of the mpm_idx are CABAC by pass coded.

The present disclosure targets improvement in the intra mode signaling scheme. In the present disclosure, a video decoding method and a video decoder are proposed.

Figure 7:
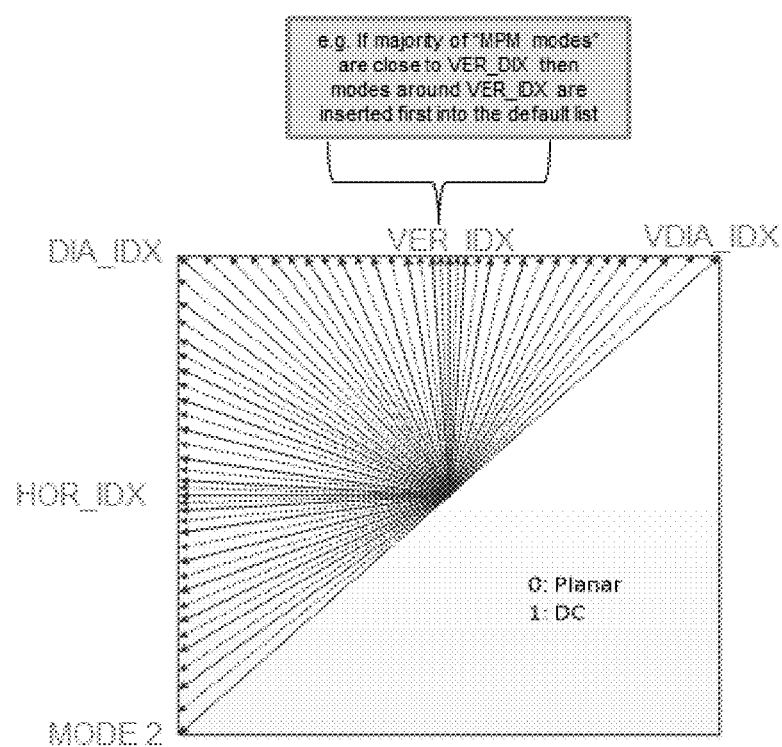
FIG. 7 shows a schematic diagram illustrating an example of first three modes in remaining mode list generation process.

FIG. 7 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

In another aspect of the present application, a decoder comprising processing circuitry is disclosed configured for carrying out the above decoding methods.

In another aspect of the present application, a computer program product is disclosed which comprising a program code for performing the above decoding methods.

In another aspect of the present application, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above decoding methods.

The processing circuitry can be implemented in hardware, or in a combination of hardware and software, for example by a software programmable processor or the like.

In another aspect of the present application, an encoding method is disclosed, which comprising:

obtaining a intra prediction mode of a picture block from a plurality of intra prediction mode, the plurality of intra prediction modes for the picture block comprises a set of Most Probable Modes, MPMs, and a set of non-MPMs, wherein the set of non-MPMs comprises a first set of intra prediction modes and a second set of intra prediction modes;

if the intra prediction mode of the picture block is in the set of non-MPMs, generating a mapping relationship between at least one intra prediction mode in the first set of intra prediction modes and at least one intra prediction mode in the set of non-MPMs;

encoding the intra prediction mode of the picture block to obtain an intra prediction mode codeword according to the mapping relationship.

In one implementation form of the present application, the process of obtaining a intra prediction mode of a picture block can refers to the relative disclosure in the below detailed description of embodiments part, or the relative disclosure in the field of video coding technology, such as in the ITU-T H.264, ITU-T H.265.

In one implementation form of the present application, the encoding method further comprising: generating a set of MPMs, determining whether the intra prediction mode of the picture block is in the set of MPMs. Hence, if the intra prediction mode of the picture block is not in the set of MPMs, then the intra prediction mode of the picture block is in the set of non-MPMs.

The process of generating a set of MPMs can refers to the relative disclosure in the description part, or the relative disclosure in the field of video coding technology, such as in the ITU-T H.264, ITU-T H.265.

In one implementation form of the present application, the process of generating a mapping relationship between at least one intra prediction mode in the first set of intra prediction modes and at least one intra prediction mode in the set of non-MPMs can refers to the relative disclosure in the decoding side.

In one implementation form of the present application, a first set of intra prediction modes is coded using 5 bits and a second set of intra prediction modes is coded using 6 bits.

In another aspect of the present application, an encoder comprising processing circuitry is disclosed configured for carrying out the above encoding methods.

In another aspect of the present application, a computer program product is disclosed which comprising a program code for performing the above encoding methods.

In another aspect of the present application, an encoder for encoding video data is disclosed, the encoder comprising: one or more processors; and a non-transitory computer-readable storage medium coupled to the processors and storing programming for execution by the processors, wherein the programming, when executed by the processors, configures the encoder to carry out the above encoding methods.

The processing circuitry can be implemented in hardware, or in a combination of hardware and software, for example by a software programmable processor or the like.

Figure 8:
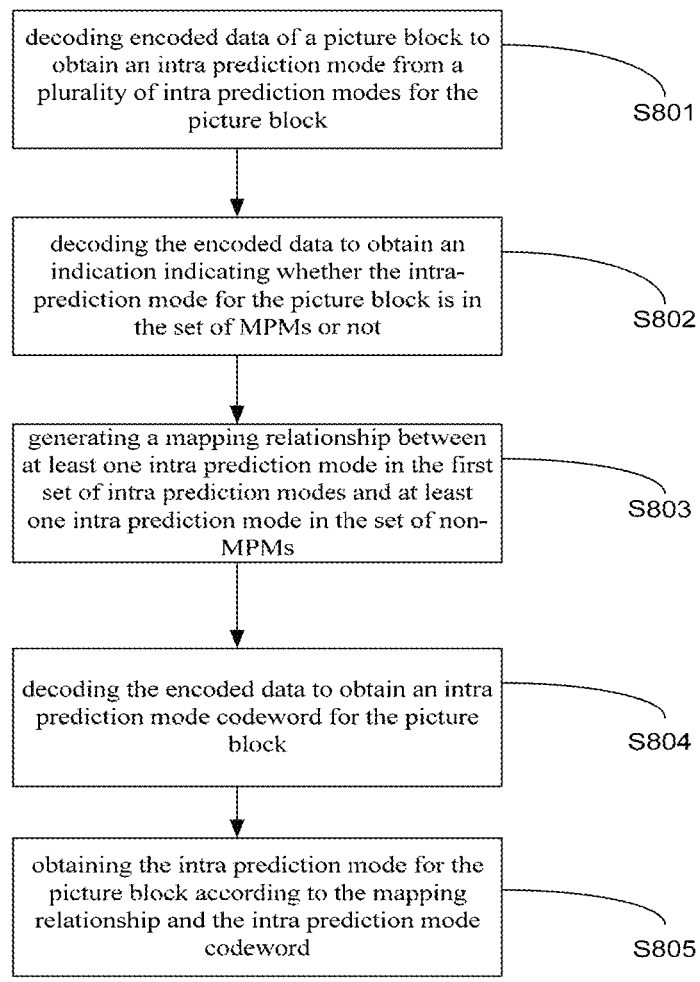
FIG. 8 shows a schematic diagram illustrating an example of a video decoding method.

In one implementation form of the present application, according to FIG. 8, the present application discloses a video decoding method, which comprises:

S801: decoding encoded data of a picture block to obtain an intra prediction mode from a plurality of intra prediction modes for the picture block;

the plurality of intra prediction modes for the picture block comprises a set of Most Probable Modes, MPMs, and a set of non-MPMs, wherein the set of non-MPMs comprises a first set of intra prediction modes and a second set of intra prediction modes, wherein a mode in the first set of intra prediction modes is encoded using N bits, and a mode in the second set of intra prediction modes is encoded using M bits, N and M are positive integers, N is less than M, wherein the decoding the encoded data of the picture block to obtain the intra prediction mode from a plurality of intra prediction modes for the picture block (S801) comprises:

S802: decoding the encoded data to obtain an indication indicating whether the intra-prediction mode for the picture block is in the set of MPMs or not; if the indication indicates that the intra prediction mode for the picture block is not in the set of MPMs,

S803: generating a mapping relationship between at least one intra prediction mode in the first set of intra prediction modes and at least one intra prediction mode in the set of non-MPMs;

S804: decoding the encoded data to obtain an intra prediction mode codeword for the picture block;

S805: obtaining the intra prediction mode for the picture block according to the mapping relationship and the intra prediction mode codeword.

According to the video decoding method of the present application, a truncated binarization scheme is used to code prediction modes in the set of non-MPMs, and a mapping relationship is generated, hence the prediction mode for the current block have a higher possibility to be coded use less bits and the computational complexity in the decoder side is reduced.

Figure 9:
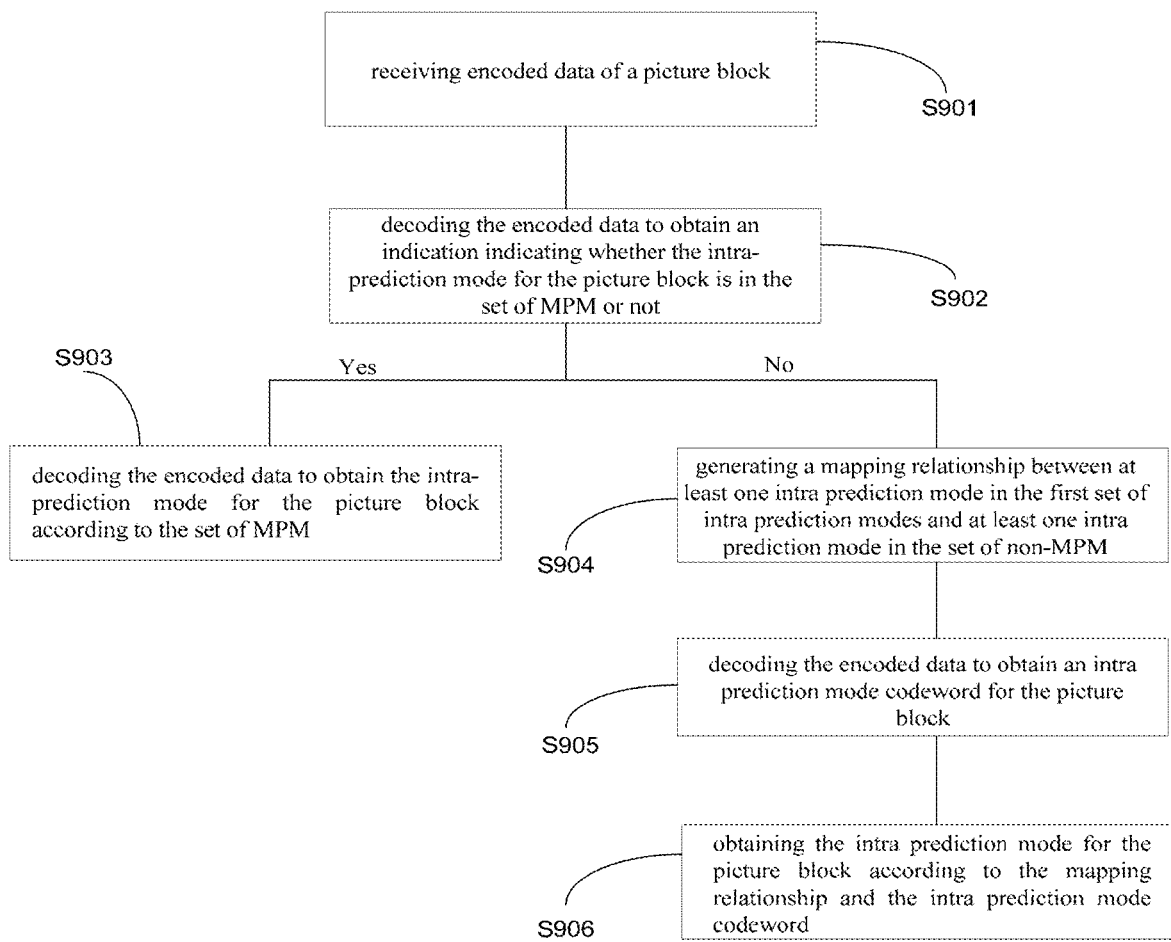
FIG. 9 shows another schematic diagram illustrating an example of a video decoding method.

In one implementation form of the present application, according to FIG. 9, the present application discloses a video decoding method, comprising:

S901: receiving encoded data of a picture block;

The decoder side may be configured to receive the encoded picture data via a direct communication link between the encoder side and the decoder side, e.g. a direct wired or wireless connection, or via any kind of network, e.g. a wired or wireless network or any combination thereof, or any kind of private and public network, or any kind of combination thereof.

S902: decoding the encoded data to obtain an indication indicating whether the intra-prediction mode for the picture block is in the set of MPMs or not.

The indication indicating the intra prediction mode for the picture block is in the set of MPM or not may be a flag, when the value of the flag is 1 may indicate that the intra-prediction mode for the picture block is in the set of MPMs, when the value of the flag is 0 may indicate that the intra-prediction mode for the picture block is not in the set of MPMs. For example, at the encoder side, if a MPM list (a set of MPMs) is a set of intra modes say [25, 42, 63] and the current blocks intra mode value is 42, then the MPM flag indicator is set to 1 as the intra mode for the current block is found at the second entry of the MPM list. If for e.g. the current blocks intra mode is 41 instead of 42, then the MPM flag indicator is set to 0, the MPM flag is sent to the decode side in the encoded data.

If the indication indicates that the intra prediction mode for the picture block is in the set of MPMs, perform step S903;

If the indication indicates that the intra prediction mode for the picture block is not in the set of MPMs, perform step S904;

S903: decoding the encoded data to obtain the intra-prediction mode for the picture block according to the set of MPMs;

In one example, if the indication indicating the intra prediction mode for the picture block is in the set of MPMs. The derivation process for the intra prediction mode for the picture block (IntraPredModeY[xPb][yPb]) is defined as follows:

IntraPredModeY[xPb][yPb] is derived by applying the following procedure: If intra_luma_mpm_flag[xPb][yPb] is equal to 1 (which indicating the intra prediction mode for the picture block is in the set of MPM), the IntraPredModeY[xPb][yPb] is set equal to candModeList[intra_luma_mpm_idx[xPb][yPb]], where (xPb , yPb) specifies the top-left sample of the current luma prediction block relative to the top-left luma sample of the current picture, and candModeList is the actual MPM list, decoding the encoded data to obtain an MPM index, obtaining the intra prediction mode of the picture block according to the MPM index and the MPM list.

In an example, the set of MPMs is (15, 0, 20), the value of the MPM index is 2, so the intra prediction mode of the picture block is planar mode (value 0). In another example, the set of MPMs is (15, 36, 0, 1, 21, 19), the value of the MPM index is 5, so the intra prediction mode of the picture block is angular mode 21.

S904: generating a mapping relationship between at least one intra prediction mode in the first set of intra prediction modes and at least one intra prediction mode in the set of non-MPMs;

In an example, if the indication indicates that the intra prediction mode for the picture block is not in the set of MPMs, two lists are constructed: namely, codeword list and derived mode list.

The first codeword list is constructed as follows:
1. find the smallest mode in the MPM list, assume the smallest mode is Ms.
2. set an initial increment variable Inc=1.
3. set candidate mode Mc as (Ms+Inc), check if mode Mc is also in the MPM list.
if Mc not in MPM list, add Mc into the codeword list
otherwise, go to step 4
4. check if the inserted entries in codeword list is full (inserted length equals to the length of codeword list):
If full, terminate;
Otherwise, set Inc=Inc+1, and go to step 3.
To summarize, the codeword list will contain the smallest modes except the ones that have been present in MPM list. Given the length of MPM list is L, the length of the codeword list is 64−(67−L)=L−3. An example, if MPM list is (15, 36, 0, 1, 21, 19), then the constructed codeword is (2, 3, 4).

The second derived mode list is constructed as follows:
1 find the first two angular modes in MPM list, assuming found ones are angular0 and angular1.
2. set an initial increment variable Inc=1.
3. derive a new mode $M0_{minus}$=angular0−Inc. Note $M0_{minus}$ shall be guaranteed also an angular mode (i.e. 66>=$M0_{minus}$>=2). Therefore, if angular0 equals to 2, Inc is 1; then the derived $M0_{minus}$ would be 66; If Inc is 2, then $M0_{minus}$ would be 65, etc. The minus operation would wrap up to the maximum angular mode.
4. check if $M0_{minus}$ in the MPM list, if not and if the derived mode list is not full, insert $M0_{minus}$ to derived mode list. Otherwise,
If derived mode list is full, terminate.
Otherwise, go to step 5.
5. derive a new mode $M0_{plus}$=angular0+Inc. Note $M0_{plus}$ shall be guaranteed also an angular mode (i.e. 66>=$M0_{plus}$>=2). Therefore, if angular0 equals to 66, Inc is 1, then the derived $M0_{plus}$ would be 2, If Inc is 2, then $M0_{plus}$ would be 3, etc. The plus operation would wrap down to the minimum angular mode.
6. check if $M0_{plus}$ in the MPM list, if not and if the derived mode list is not full, insert $M0_{plus}$ to the derived mode list. Otherwise,
If derived mode list is full, terminate.
Otherwise, go to step 7.
7. repeat step 3-6 by replacing angular0 with angular1
8. set Inc=Inc+1, and repeat step 3-7
To summarize, the derived mode list obtains neighboring modes of the first two angular modes in the MPM list. If these neighboring modes are already included in the MPM list, then they are excluded from the derived mode list. Given the length of MPM list is L, the length of the derived mode list is 64-(67−L)=L−3. An example, if MPM list is (15, 36, 0, 1, 21, 19), then the constructed derived mode list is (14, 16, 35).
When codeword list and derived mode list are constructed, a bidirectional mapping relationship between them are built. Namely, given the above example lists with codeword list (2, 3, 4) and derived mode list (14, 16, 35), 2↔14, 3↔16, and 3↔35, where ↔ represents bidirectional mapping.

Two options are allowed for building the bidirectional mapping relationship between the codeword list and the derived mode list. The first option is that the derived mode list is allowed to be constructed in a way so that there might be elements both exist in derived mode list and codeword list. The other option is that the derived modes list are not allowed to be overlapped with the modes in the codeword list.

In another example, in one implementation form of the present application, wherein the generating the mapping relationship between at least one intra prediction mode in the first set of intra prediction modes and at least one intra prediction mode in the set of non-MPMs, comprises: ranking a plurality of intra prediction mode categories according to the number and/or the direction of intra prediction modes in the set of MPM falling within each intra prediction mode category; generating the mapping relationship according to the highest ranked intra prediction mode category.

In an example, 5 angular intra prediction mode categories, namely dc mode (DC_IDX), vertical mode (VER_IDX), horizontal mode (HOR_IDX), intra mode 2 (2), vertical diagonal mode (VDIA_IDX) and diagonal mode DIA_IDX, wherein an angular intra prediction mode of the most probable modes list falling within each angular intra prediction mode category, for example, corresponds to associating each of the angular intra prediction modes of the most probable modes list to the angular intra prediction mode category being closest to the corresponding angular intra prediction mode of the most probable modes list. In another example, repeating this step with the second highest ranked angular intra prediction mode category.

In an example, the generating the mapping relationship between at least one intra prediction mode in the first set of intra prediction modes and at least one intra prediction mode in the set of non-MPMs comprises: generating an initial set of intra prediction modes according to add an offset to a plurality of values corresponding to the set of MPMs; classifying the set of MPMs to obtain an highest ranked intra prediction mode category; generating the mapping relationship according to the highest ranked intra prediction mode category and the initial set of intra prediction modes.

In an example, the initial set of intra prediction modes is generated according to add an offset of −1,+1, +2, −2, +3, −3, +4 or −4 to a plurality of values corresponding to the set of MPMs.

In an example, the mapping relationship is generated according to a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX).

S905: decoding the encoded data to obtain an intra prediction mode codeword for the picture block;

The codeword is encoded by using N bits or M bits in the encoded side. In an example, as it is a bidirectional mapping relationship, so the intra prediction mode corresponding to the codeword may be mapped to another intra prediction mode in the set of non-MPMs.

S906: obtaining the intra prediction mode for the picture block according to the mapping relationship and the intra prediction mode codeword.

In an example, after a bidirectional mapping relationship is built, check if the intra prediction mode corresponding to the intra prediction mode codeword is in the codeword list or the derived mode list:

If the parsed intra prediction mode is neither in codeword list nor the derived mode list, set the final prediction mode as the parsed intra prediction mode.

If the parsed intra prediction mode is only in codeword list or only in derived mode list, then set the final prediction mode as its corresponding mapped intra prediction mode.

If the parsed intra prediction mode is in both codeword list and derived mode list, a mechanism is introduced in the building of these two list, so that bidirectional mapping relationship is adjusted and all the overlapped modes map to themselves in another list. An example: MPM list (0 1 2 3 50 66), codeword list is (4 5 6), derived mode list (4 65 5). When construct derived mode list or codeword list, we make sure 4↔4, 5↔5, and 6↔65.

A decoder comprising processing circuitry configured for carrying out the above methods.

In the present disclosure, a computer program product comprising a program code is disclosed for performing the above methods.

In the present disclosure, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above methods.

FIG. 7 shows an example of 67 intra prediction modes, e.g., as proposed for VVC, wherein the plurality of intra prediction modes of 67 intra prediction modes comprise: planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

In the following, further embodiments are disclosed, wherein the numbering may not necessarily coincide with the numbering of other embodiments or examples of the description.

Embodiment 1. A method for constructing a Most Probable Mode, MPM, list, wherein the method comprises: determining whether a left block of a current coding block is available or not, if the left block of the current coding block is available, adding an intra prediction mode of the left block into an MPM list; determining whether an above block of the current coding block is available or not, if the above block of the current coding block is available, adding an intra prediction mode of the above block into the MPM list; if a planar mode is not in the MPM list, adding the planar mode into the MPM list; if a DC mode is not in the MPM list, adding the DC mode into the MPM list.

Embodiment 2. The method of embodiment 1, wherein when the prediction mode of the left block is not an intra prediction mode, the left block of the current coding block is not available.

Embodiment 3. The method of embodiment 1 or 2, wherein when the current coding block is a coding block located in the left-most side of a frame, the left block of the current coding block is not available.

Embodiment 4. The method of any one of embodiments 1 to 3, wherein parallel processing is supported and the current coding block is a coding block located in the left-most side of a Tile, the left block of the current coding block is not available.

Embodiment 5. The method of any one of embodiments 1 to 4, wherein parallel processing is not supported and the current coding block is a coding block located in the left-most side of a Tile but not in the left-most side of a frame, the left block of the current coding block is available.

Embodiment 6. The method of any one of embodiments 1 to 5, wherein parallel processing is supported and the current coding block is a coding block located in the left-most side of a slice, the left block of the current coding block is not available.

Embodiment 7. The method of any one of embodiments 1 to 6, wherein parallel processing is not supported and the current coding block is a coding block located in the left-most side of a slice but not in the left-most side of a frame, the left block of the current coding block is available.

Embodiment 8. The method of any one of embodiments 1 to 7, wherein when the prediction mode of the above block is not an intra prediction mode, the above block of the current coding block is not available.

Embodiment 9. The method of any one of embodiments 1 to 8, wherein when the current coding block is a coding block located in the top-most side of a frame, the above block of the current coding block is not available.

Embodiment 10. The method of any one of embodiments 1 to 9, wherein parallel processing is supported and the current coding block is a coding block located in the top-most side of a Tile, the above block of the current coding block is not available.

Embodiment 11. The method of any one of embodiments 1 to 10, wherein parallel processing is not supported and the current coding block is a coding block located in the top-most side of a Tile but not in the top-most side of a frame, the above block of the current coding block is available.

Embodiment 12. The method of any one of embodiments 1 to 11, wherein parallel processing is supported and the current coding block is a coding block located in the top-most side of a slice, the above block of the current coding block is not available.

Embodiment 13. The method of any one of embodiments 1 to 12, wherein parallel processing is not supported and the current coding block is a coding block located in the top-most side of a slice but not in the top-most side of a frame, the above block of the current coding block is available.

Embodiment 14. The method of any one of embodiments 1 to 13, when line buffer size is constrained and the current coding block is a coding block located in the top-most side of a current CTU, the above block of the current coding block is not available.

Embodiment 15. The method of any one of embodiments 1 to 14, the method further comprises:
if the left block of the current coding block is available and the intra prediction mode of the left block is an angular mode, adding an offset to the prediction mode of the left block to obtain a new prediction mode, if the new prediction mode is not in the MPM list, adding the new prediction mode into the MPM list.

Embodiment 16. The method of embodiment 15, wherein the offset is −1.

Embodiment 17. The method of embodiment 15, wherein the offset is 1.

Embodiment 18. The method of any one of embodiments 1 to 17, the method further comprises:
if the above block of the current coding block is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

Embodiment 19. The method of embodiment 18, wherein the offset is −1.

Embodiment 20. The method of embodiment 18, wherein the offset is 1.

Embodiment 21. The method of any one of embodiments 1 to 20, the method further comprises:
adding a vertical mode (VER_IDX), a horizontal mode (HOR_IDX), an intra mode 2 (2), a vertical diagonal mode (VDIA_IDX) or a diagonal mode (DIA_IDX) into the MPM list.

Embodiment 22. The method of any one of embodiments 1 to 20, the method further comprises a list of angular mode candidates comprising or consisting: a vertical mode (VER_IDX), a horizontal mode (HOR_IDX), an intra mode 2 (2), a vertical diagonal mode (VDIA_IDX) or a diagonal mode (DIA_IDX) into the MPM list; and the method further comprises: iteratively determining according to their order in the list, whether an angular mode of the list is in the MPM list, and if the respective angular mode is not in the MPM list adding the respective angular mode into the MPM list.

Embodiment 23. The method of any one of embodiments 1 to 20, wherein the constructing of the MPM list starts with the step of determining whether a left block of a current coding block is available or not, e.g. based on an empty MPM list.

Embodiment 24. The method according to any of the embodiments 1 to 23, the method further comprises: if the left block of the current coding block is not available and an other block in the general left direction is available (e.g. BL or AL in FIG. 5), inserting the intra prediction mode of the other block into the MPM list, if the left block is available, not inserting the intra prediction mode of the other block into the MPM list.

Embodiment 25. The method according to any of the embodiments 1 to 23, the method further comprises: if the above block of the current coding block is not available and an other block in the general above direction is available (e.g. AR or AL in FIG. 5), inserting the intra prediction mode of the other block into the MPM list, if the above block is available, not inserting the intra prediction mode of the other block into the MPM list.

Embodiment 26. The method according to any one of the embodiments 1 to 25, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list if they are not in the MPM list.

Embodiment 27. The method according to any one of the embodiments 1 to 26, the method further comprises:
if both the left and the above block of the current coding block are not angular, then further check one more other neighboring blocks (e.g. BL or AL or AR in FIG. 5). If any of them (BL, or AL, or AR) is angular, then use this angular mode as the starting angular mode for the −1+1 derivation process, as described before.

Embodiment 28. An encoder comprising processing circuitry for carrying out the method according to any one of embodiments 1 to 27.

Embodiment 29. A decoder comprising processing circuitry for carrying out the method according to any one of embodiments 1 to 27.

Embodiment 30. A computer program product comprising a program code for performing the method according to any one of embodiments 1 to 27.

Embodiment 31. A decoder for construct a Most Probable Mode, MPM, list, comprises: one or more processors; and a non-transitory computer-readable storage medium coupled to the processors and storing programming for execution by the processors, wherein the programming, when executed by the processors, configures the decoder to carry out the method according to any one of embodiments 1 to 27.

Embodiment 32. An encoder for construct a Most Probable Mode, MPM, list, comprising:
one or more processors; and a non-transitory computer-readable storage medium coupled to the processors and storing programming for execution by the processors, wherein the programming, when executed by the processors, configures the encoder to carry out the method according to any one of embodiments 1 to 27.

Embodiment 33. A method for constructing a Most Probable Mode, MPM, list for intra prediction, the method comprising: determining whether a left block of a current coding block is available or not, if the left block of the current coding block is available, adding an intra prediction mode of the left block into the MPM list; determining whether an above block of the current coding block is available or not, if the above block of the current coding block is available and an intra prediction mode of the above block is not in the MPM list, adding the intra prediction mode of the above block into the MPM list; if a planar mode is not in the MPM list, adding the planar mode into the MPM list; if a DC mode is not in the MPM list, adding the DC mode into the MPM list.

Embodiment 34. The method of embodiment 33, wherein when the current coding block is a coding block located in the left-most side of a frame, the left block of the current coding block is not available.

Embodiment 35. The method of embodiment 33 or 34, wherein when the current coding block is a coding block not located in the left-most side of a frame, the left block of the current coding block is available.

Embodiment 36. The method of any one of embodiments 33 to 35, wherein when the current coding block is a coding block located in the top-most side of a frame, the above block of the current coding block is not available.

Embodiment 37. The method of any one of embodiments 33 to 36, wherein when the current coding block is a coding block not located in the top-most side of a frame, the above block of the current coding block is available.

Embodiment 38. The method of any one of embodiments 33 to 37, wherein the method further comprises:
if the left block of the current coding block is available and the intra prediction mode of the left block is an angular mode, adding an offset to the prediction mode of the left block to obtain a new prediction mode, if the new prediction mode is not in the MPM list, adding the new prediction mode into the MPM list.

Embodiment 39. The method of any one of embodiments 33 to 38, wherein the method further comprises:
if the above block of the current coding block is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

Embodiment 40. The method of embodiment 38 or 39, wherein the offset is −1.

Embodiment 41. The method of embodiment 38 or 39, wherein the offset is 1.

Embodiment 42. The method of any one of embodiments 33 to 41, wherein the method further comprises:
if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a horizontal mode (HOR_IDX), an intra mode 2 (2), a vertical diagonal mode (VDIA_IDX) or a diagonal mode (DIA_IDX).

Embodiment 43. The method of any one of embodiments 33 to 41, wherein the method further comprises:
if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

Embodiment 44. The method of any one of embodiments 33 to 41, wherein the method further comprises:
if the left block of the current coding block is not available and a quantity of intra prediction modes in the MPM list is less than a threshold,
checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a vertical diagonal mode (VDIA_IDX), a diagonal mode (DIA_IDX) or an intra mode 2 (2).

Embodiment 45. The method of any one of embodiments 33 to 41, wherein the method further comprises:
if the left block of the current coding block is not available and a quantity of intra prediction modes in the MPM list is less than a threshold,
adding iteratively an intra-prediction mode of a set of intra-prediction modes comprising a vertical mode (VER_IDX), a vertical diagonal mode (VDIA_IDX), a diagonal mode (DIA_IDX) or an intra mode 2 (2) according to the aforementioned order to the MPM list, when the intra-prediction mode is not comprised in the MPM list, until the quantity of prediction modes is equal to the threshold.

Embodiment 46. The method of any one of embodiments 33 to 41, wherein the method further comprises:
if a quantity of intra prediction modes in the MPM list is less than a threshold,
checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a horizontal mode (HOR_IDX), an intra prediction mode corresponding to VER_IDX with an offset −4 or an intra prediction mode corresponding to VER_IDX with an offset 4.

Embodiment 47. The method of any one of embodiments 33 to 41, wherein the method further comprises:
if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

Embodiment 48. The method of any one of embodiments 33 to 41, wherein the method further comprises:
if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a horizontal mode (HOR_IDX), an intra prediction mode corresponding to VER_IDX with an offset 4 or an intra prediction mode corresponding to VER_IDX with an offset −4.

Embodiment 49. The method of any one of embodiments 33 to 41, wherein the method further comprises:
if a quantity of intra prediction modes in the MPM list is less than a threshold, adding iteratively an intra-prediction mode of a set of intra-prediction modes comprising a vertical mode (VER_IDX), a horizontal mode (HOR_IDX), an intra prediction mode corresponding to VER_IDX with an offset 4 or an intra prediction mode corresponding to VER_IDX with an offset −4 according to the aforementioned order to the MPM list, when the intra-prediction mode is not comprised in the MPM list, until the quantity of prediction modes is equal to the threshold.

Embodiment 50. The method of any one of embodiments 33 to 41, wherein the method further comprises:
if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets:
a vertical mode (VER_IDX), a vertical diagonal mode (VDIA_IDX), an intra prediction mode corresponding to VER_IDX with an offset −1, and an intra prediction mode corresponding to VER_IDX with an offset 1; or
a vertical mode (VER_IDX), a vertical diagonal mode (VDIA_IDX), an intra prediction mode corresponding to VER_IDX with an offset −4, and an intra prediction mode corresponding to VER_IDX with an offset 4; or
a vertical mode (VER_IDX), a vertical diagonal mode (VDIA_IDX), an intra prediction mode corresponding to VDIA_IDX with an offset −4, and an intra prediction mode corresponding to VER_IDX with an offset −1; or
a vertical mode (VER_IDX), a vertical diagonal mode (VDIA_IDX), an intra prediction mode corresponding to VDIA_IDX with an offset −4, and an intra prediction mode corresponding to VER_IDX with an offset +1; or
a vertical mode (VER_IDX), a vertical diagonal mode (VDIA_IDX), an intra prediction mode corresponding to VDIA_IDX with an offset −1, and an intra prediction mode corresponding to VER_IDX with an offset −1; or
a vertical mode (VER_IDX), a vertical diagonal mode (VDIA_IDX), an intra prediction mode corresponding to VDIA_IDX with an offset −1, and an intra prediction mode corresponding to VER_IDX with an offset 1; or
a vertical mode (VER_IDX), a vertical diagonal mode (VDIA_IDX), an intra prediction mode corresponding to VER_IDX with an offset −1, and an intra prediction mode corresponding to VDIA_IDX with an offset −4; or
a vertical mode (VER_IDX), a vertical diagonal mode (VDIA_IDX), an intra prediction mode corresponding to VER_IDX with an offset 1, and an intra prediction mode corresponding to VDIA_IDX with an offset −4; or
a vertical mode (VER_IDX), a vertical diagonal mode (VDIA_IDX), an intra prediction mode corresponding to VER_IDX with an offset −1, and an intra prediction mode corresponding to VDIA_IDX with an offset −1; or
a vertical mode (VER_IDX), a vertical diagonal mode (VDIA_IDX), an intra prediction mode corresponding to VER_IDX with an offset 1, and an intra prediction mode corresponding to VDIA_IDX with an offset −1.

Embodiment 51. The method of any one of embodiments 33 to 41, wherein the method further comprises:
if the left block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold;
wherein the set of intra-prediction modes comprises one of the following intra prediction modes sets:
a vertical mode (VER_IDX), a vertical diagonal mode (VDIA_IDX), an intra prediction mode corresponding to VER_IDX with an offset −1, and an intra prediction mode corresponding to VER_IDX with an offset 1; or
a vertical mode (VER_IDX), a vertical diagonal mode (VDIA_IDX), an intra prediction mode corresponding to VER_IDX with an offset −4, and an intra prediction mode corresponding to VER_IDX with an offset 4; or a vertical mode (VER_IDX), a vertical diagonal mode (VDIA_IDX), an intra prediction mode corresponding to VDIA_IDX with an offset −4, and an intra prediction mode corresponding to VER_IDX with an offset −1; or
a vertical mode (VER_IDX), a vertical diagonal mode (VDIA_IDX), an intra prediction mode corresponding to VDIA_IDX with an offset −4, and an intra prediction mode corresponding to VER_IDX with an offset +1; or
a vertical mode (VER_IDX), a vertical diagonal mode (VDIA_IDX), an intra prediction mode corresponding to VDIA_IDX with an offset −1, and an intra prediction mode corresponding to VER_IDX with an offset −1; or
a vertical mode (VER_IDX), a vertical diagonal mode (VDIA_IDX), an intra prediction mode corresponding to VDIA_IDX with an offset −1, and an intra prediction mode corresponding to VER_IDX with an offset 1; or
a vertical mode (VER_IDX), a vertical diagonal mode (VDIA_IDX), an intra prediction mode corresponding to VER_IDX with an offset −1, and an intra prediction mode corresponding to VDIA_IDX with an offset −4; or
a vertical mode (VER_IDX), a vertical diagonal mode (VDIA_IDX), an intra prediction mode corresponding to VER_IDX with an offset 1, and an intra prediction mode corresponding to VDIA_IDX with an offset −4; or
a vertical mode (VER_IDX), a vertical diagonal mode (VDIA_IDX), an intra prediction mode corresponding to VER_IDX with an offset −1, and an intra prediction mode corresponding to VDIA_IDX with an offset −1; or
a vertical mode (VER_IDX), a vertical diagonal mode (VDIA_IDX), an intra prediction mode corresponding to VER_IDX with an offset 1, and an intra prediction mode corresponding to VDIA_IDX with an offset −1.

Embodiment 52. The method of any one of embodiments 33 to 41, wherein the method further comprises:
if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a horizontal mode (HOR_IDX), an intra mode 2 (2), a diagonal mode (DIA_IDX) or a vertical diagonal mode (VDIA_IDX).

Embodiment 53. The method of any one of embodiments 33 to 41, wherein the method further comprises:
if a quantity of intra prediction modes in the MPM list is less than a threshold, the above block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

Embodiment 54. The method of any one of embodiments 33 to 41, wherein the method further comprises:
if a quantity of intra prediction modes in the MPM list is less than a threshold, the left block of the current coding block is available and the above block of the current coding block is available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a vertical mode (VER_IDX), a horizontal mode (HOR_IDX), an intra mode 2 (2), a vertical diagonal mode (VDIA_IDX) or a diagonal mode (DIA_IDX).

Embodiment 55. The method of any one of embodiments 33 to 41, wherein the method further comprises:
if a quantity of intra prediction modes in the MPM list is less than a threshold, the left block of the current coding block is available and the above block of the current coding block is available, adding iteratively an intra-prediction mode of a set of intra-prediction modes comprising a vertical mode (VER_IDX), a horizontal mode (HOR_IDX), an intra mode 2 (2), a vertical diagonal mode (VDIA_IDX) or a diagonal mode (DIA_IDX) according to the aforementioned order to the MPM list, when the intra-prediction mode is not comprised in the MPM list, until the quantity of prediction modes is equal to the threshold.

Embodiment 56. The method of any one of embodiments 33 to 41, wherein the method further comprises:
if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a horizontal mode (HOR_IDX), an intra mode 2 (2), a diagonal mode (DIA_IDX) or a vertical diagonal mode (VDIA_IDX).

Embodiment 57. The method of any one of embodiments 33 to 41, wherein the method further comprises:
if a quantity of intra prediction modes in the MPM list is less than a threshold, the above block of the current coding block is not available, adding iteratively an intra-prediction mode of a set of intra-prediction modes comprising a horizontal mode (HOR_IDX), an intra mode 2 (2), a diagonal mode (DIA_IDX) or a vertical diagonal mode (VDIA_IDX) according to the aforementioned order to the MPM list, when the intra-prediction mode is not comprised in the MPM list, until the quantity of prediction modes is equal to the threshold.

Embodiment 58. The method of any one of embodiments 33 to 41, wherein the method further comprises:
if a quantity of intra prediction modes in the MPM list is less than a threshold, the left block of the current coding block is available and the above block of the current coding block is available, checking whether a first intra prediction mode of a set of intra-prediction modes is comprised in the MPM list, and adding the first intra-prediction mode to the MPM list if the first intra-prediction mode is not comprised in the MPM list, wherein the set of intra-prediction modes comprises a vertical mode (VER_IDX), a horizontal mode (HOR_IDX), an intra prediction mode corresponding to VER_IDX with an offset −4 or an intra prediction mode corresponding to VER_IDX with an offset 4.

Embodiment 59. The method of any one of embodiments 33 to 41, wherein the method further comprises:
if a quantity of intra prediction modes in the MPM list is less than a threshold, the left block of the current coding block is available and the above block of the current coding block is available, adding iteratively an intra-prediction mode of a set of intra-prediction modes comprises a vertical mode (VER_IDX), a horizontal mode (HOR_IDX), an intra prediction mode corresponding to VER_IDX with an offset −4 or an intra prediction mode corresponding to VER_IDX with an offset 4 according to the aforementioned order to the MPM list, when the intra-prediction mode is not comprised in the MPM list, until the quantity of prediction modes is equal to the threshold.

Embodiment 60. The method of any one of embodiments 33 to 41, wherein the method further comprises:
if the above block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets:

a horizontal mode (HOR_IDX), an intra mode 2 (2), an intra prediction mode corresponding to HOR_IDX with an offset −1, and an intra prediction mode corresponding to HOR_IDX with an offset 1; or a horizontal mode (HOR_IDX), an intra mode 2 (2), an intra prediction mode corresponding to HOR_IDX with an offset −4, and HOR_IDX add an offset 4; or a horizontal mode (HOR_IDX), an intra mode 2 (2), an intra prediction mode corresponding to an intra mode 2 (2) with an offset 4, and an intra prediction mode corresponding to HOR_IDX with an offset −1; or a horizontal mode (HOR_IDX), an intra mode 2 (2), an intra prediction mode corresponding to an intra mode 2 (2) with an offset 4, and an intra prediction mode corresponding to HOR_IDX with an offset 1; or a horizontal mode (HOR_IDX), an intra mode 2 (2), an intra prediction mode corresponding to an intra mode 2 (2) with an offset 1, and an intra prediction mode corresponding to HOR_IDX with an offset −1; or a horizontal mode (HOR_IDX), an intra mode 2 (2), an intra prediction mode corresponding to an intra mode 2 (2) with an offset 1, and an intra prediction mode corresponding to HOR_IDX with an offset 1; or a horizontal mode (HOR_IDX), an intra mode 2 (2), an intra prediction mode corresponding to HOR_IDX with an offset −1, and an intra prediction mode corresponding to an intra mode 2 (2) with an offset 4; or a horizontal mode (HOR_IDX), an intra mode 2 (2), an intra prediction mode corresponding to HOR_IDX with an offset 1, and an intra prediction mode corresponding to an intra mode 2 (2) with an offset 4; or a horizontal mode (HOR_IDX), an intra mode 2 (2), an intra prediction mode corresponding to HOR_IDX with an offset −1, and an intra prediction mode corresponding to an intra mode 2 (2) with an offset 1; or a horizontal mode (HOR_IDX), an intra mode 2 (2), an intra prediction mode corresponding to HOR_IDX with an offset 1, and an intra prediction mode corresponding to an intra mode 2 (2) with an offset 1.

Embodiment 61. The method of any one of embodiments 33 to 41, wherein the method further comprises:
if the above block of the current coding block is not available and a quantity of intra prediction modes in the MPM list is less than a threshold,
adding iteratively an intra-prediction mode of a set of intra-prediction modes according to the aforementioned order to the MPM list, when the intra-prediction mode is not comprised in the MPM list, until the quantity of prediction modes is equal to the threshold;
wherein the set of intra-prediction modes comprising one of the following intra prediction modes sets:
a horizontal mode (HOR_IDX), an intra mode 2 (2), an intra prediction mode corresponding to HOR_IDX with an offset −1, and an intra prediction mode corresponding to HOR_IDX with an offset 1; or a horizontal mode (HOR_IDX), an intra mode 2 (2), an intra prediction mode corresponding to HOR_IDX with an offset −4, and HOR_IDX add an offset 4; or a horizontal mode (HOR_IDX), an intra mode 2 (2), an intra prediction mode corresponding to an intra mode 2 (2) with an offset 4, and an intra prediction mode corresponding to HOR_IDX with an offset −1; or a horizontal mode (HOR_IDX), an intra mode 2 (2), an intra prediction mode corresponding to an intra mode 2 (2) with an offset 4, and an intra prediction mode corresponding to HOR_IDX with an offset 1; or a horizontal mode (HOR_IDX), an intra mode 2 (2), an intra prediction mode corresponding to an intra mode 2 (2) with an offset 1, and an intra prediction mode corresponding to HOR_IDX with an offset −1; or a horizontal mode (HOR_IDX), an intra mode 2 (2), an intra prediction mode corresponding to an intra mode 2 (2) with an offset 1, and an intra prediction mode corresponding to HOR_IDX with an offset 1; or a horizontal mode (HOR_IDX), an intra mode 2 (2), an intra prediction mode corresponding to HOR_IDX with an offset −1, and an intra prediction mode corresponding to an intra mode 2 (2) with an offset 4; or a horizontal mode (HOR_IDX), an intra mode 2 (2), an intra prediction mode corresponding to HOR_IDX with an offset 1, and an intra prediction mode corresponding to an intra mode 2 (2) with an offset 4; or a horizontal mode (HOR_IDX), an intra mode 2 (2), an intra prediction mode corresponding to HOR_IDX with an offset −1, and an intra prediction mode corresponding to an intra mode 2 (2) with an offset 1; or a horizontal mode (HOR_IDX), an intra mode 2 (2), an intra prediction mode corresponding to HOR_IDX with an offset 1, and an intra prediction mode corresponding to an intra mode 2 (2) with an offset 1.

Embodiment 62. An encoder comprising processing circuitry for carrying out the method according to any one of embodiments 33 to 61.

Embodiment 63. A decoder comprising processing circuitry for carrying out the method according to any one of embodiments 33 to 61.

Embodiment 64. A computer program product comprising a program code for performing the method according to any one of embodiments 33 to 61.

Embodiment 65. A decoder for constructing a Most Probable Mode, MPM, list, comprises:
one or more processors; and
a non-transitory computer-readable storage medium coupled to the processors and storing programming for execution by the processors, wherein the programming, when executed by the processors, configures the decoder to carry out the method according to any one of embodiments 33 to 61.

Embodiment 66. An encoder for constructing a Most Probable Mode, MPM, list, comprising:
one or more processors; and a non-transitory computer-readable storage medium coupled to the processors and storing programming for execution by the processors, wherein the programming, when executed by the processors, configures the encoder to carry out the method according to any one of embodiments 33 to 61.

Figure 10:
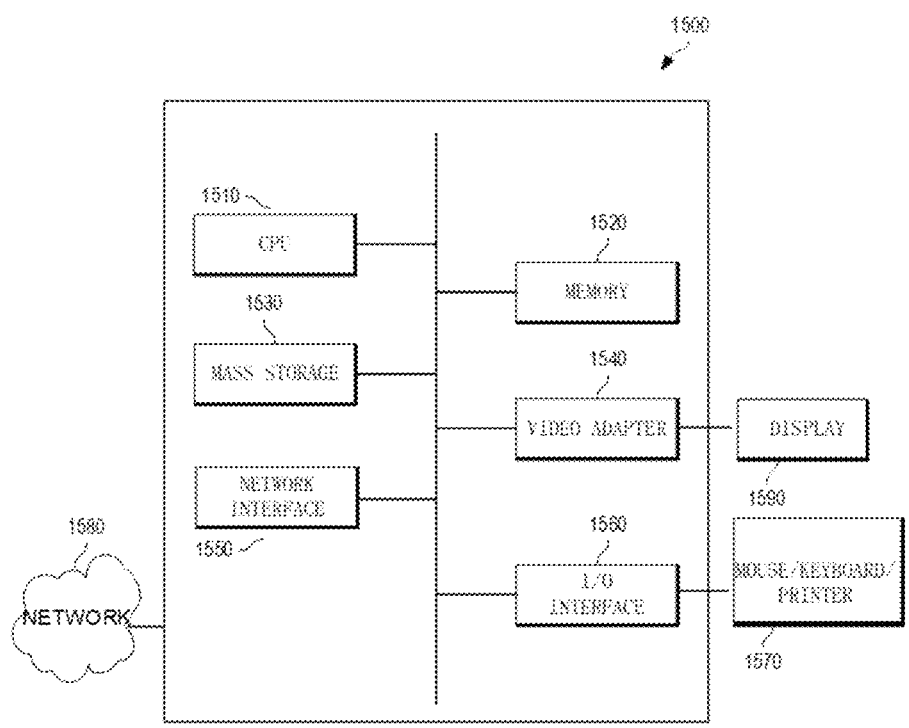
FIG. 10 shows a block diagram of an apparatus.

FIG. 10 is a schematic diagram of a network device 1300 according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

FIG. 10 is a block diagram of an apparatus 1100 that can be used to implement various embodiments. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1100 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation is, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A decoder, comprising:
one or more processors; and a non-transitory computer-readable storage medium coupled to the processors and storing programming for execution by the processors, wherein the programming, when executed by the processors, configures the decoder to:
determine a set of Most Probable Modes (MPMs) for a current block of a video encoded in a video bitstream, wherein when at least one condition is satisfied, the set of MPMs comprise: a Planar mode, a DC mode, a Vertical mode, a Horizontal mode, an intra prediction mode corresponding to a value of the Vertical mode with a first offset, and an intra prediction mode corresponding to the value of the Vertical mode with a second offset;
obtain an (MPM) flag for the current block from the video bitstream, the MPM flag indicating whether an intra prediction mode for the current block is in the set of MPMs for the current block;
obtain an MPM index for the current block from the video bitstream, when the MPM flag indicates that the intra prediction mode for the current block is in the set of MPMs for the current block; determine the intra prediction mode for the current block based on the MPM index and the set of MPMs for the current block; and
reconstruct the current block using reference samples determined based on the intra prediction mode for the current block.

2. The decoder of claim 1, wherein the at least one condition comprises one of a plurality of conditions, the plurality of conditions comprising:
an intra prediction mode of a left neighboring block of the current block is a Planar mode, and an intra prediction mode of an above neighboring block of the current block is a Planar mode;
the intra prediction mode of the left neighboring block of the current block is a Planar mode, and the intra prediction mode of the above neighboring block of the current block is a DC mode;
the left neighboring block of the current block is not available, and the intra prediction mode of the above neighboring block of the current block is a Planar mode;
the left neighboring block of the current block is not available, and the above neighboring block of the current block is not available; and
the intra prediction mode of the left neighboring block of the current block is a Planar mode, and the above neighboring block of the current block is not available.

3. The decoder of claim 1, wherein when the MPM flag for the current block indicates that the intra prediction mode for the current block is in the set of MPMs and the MPM index for the current block is 0, the intra prediction mode for the current block is the Planar mode.

4. The decoder of claim 1, wherein the first offset is −4.

5. The decoder of claim 1, wherein the second offset is +4.

6. The decoder of claim 1, wherein reconstructing the current block using reference samples determined based on the intra prediction mode for the current block comprises:
generating the reference samples by filtering samples in one or more neighboring blocks of the current block according to the intra prediction mode for the current block; and
reconstructing the current block using the reference samples.

7. A non-transitory computer-readable medium having stored thereon instructions that, when executed by one or more processors, cause the one or more processors to perform operations including:
determining a set of Most Probable Modes (MPMs) for a current block of a video encoded in a video bitstream, wherein when at least one condition is satisfied, the set of MPMs comprise: a Planar mode, a DC mode, a Vertical mode, a Horizontal mode, an intra prediction mode corresponding to a value of the Vertical mode with a first offset, and an intra prediction mode corresponding to the value of the Vertical mode with a second offset;
obtaining an (MPM) flag for the current block from the video bitstream, the MPM flag indicating whether an intra prediction mode for the current block is in the set of MPMs for the current block;
obtaining an MPM index for the current block from the video bitstream, when the MPM flag indicates that the intra prediction mode for the current block is in the set of MPMs for the current block; determine the intra prediction mode for the current block based on the MPM index and the set of MPMs for the current block; and
reconstructing the current block using reference samples determined based on the intra prediction mode for the current block.

8. The non-transitory computer-readable medium of claim 7, wherein the at least one condition comprises one of a plurality of conditions, the plurality of conditions comprising:
an intra prediction mode of a left neighboring block of the current block is a Planar mode, and an intra prediction mode of an above neighboring block of the current block is a Planar mode;
the intra prediction mode of the left neighboring block of the current block is a Planar mode, and the intra prediction mode of the above neighboring block of the current block is a DC mode;
the left neighboring block of the current block is not available, and the intra prediction mode of the above neighboring block of the current block is a Planar mode;
the left neighboring block of the current block is not available, and the above neighboring block of the current block is not available; and
the intra prediction mode of the left neighboring block of the current block is a Planar mode, and the above neighboring block of the current block is not available.

9. The non-transitory computer-readable medium of claim 7, wherein when the MPM flag for the current block indicates that the intra prediction mode for the current block is in the set of MPMs and the MPM index for the current block is 0, the intra prediction mode for the current block is the Planar mode.

10. The non-transitory computer-readable medium of claim 7, wherein the first offset is −4.

11. The non-transitory computer-readable medium of claim 7, wherein the second offset is +4.

12. The non-transitory computer-readable medium of claim 7, wherein reconstructing the current block using reference samples determined based on the intra prediction mode for the current block comprises:
generating the reference samples by filtering samples in one or more neighboring blocks of the current block according to the intra prediction mode for the current block; and reconstructing the current block using the reference samples.

13. A method for decoding a current block of an encoded video, the method comprising:
   determining a set of Most Probable Modes (MPMs) for the current block, wherein when at least one condition is satisfied, the set of MPMs comprise: a Planar mode, a DC mode, a Vertical mode, a Horizontal mode, an intra prediction mode corresponding to a value of the Vertical mode with a first offset, and an intra prediction mode corresponding to the value of the Vertical mode with a second offset;
   obtaining an (MPM) flag for the current block from a video bitstream of the encoded video, the MPM flag indicating whether an intra prediction mode for the current block is in the set of MPMs for the current block;
   obtaining an MPM index for the current block from the video bitstream, when the MPM flag indicates that the intra prediction mode for the current block is in the set of MPMs for the current block; determine the intra prediction mode for the current block based on the MPM index and the set of MPMs for the current block; and
   reconstructing the current block using reference samples determined based on the intra prediction mode for the current block.

14. A method of claim 13, wherein the at least one condition comprises one of a plurality of conditions, the plurality of conditions comprising:
   an intra prediction mode of a left neighboring block of the current block is a Planar mode, and an intra prediction mode of an above neighboring block of the current block is a Planar mode;
   the intra prediction mode of the left neighboring block of the current block is a Planar mode, and the intra prediction mode of the above neighboring block of the current block is a DC mode;
   the left neighboring block of the current block is not available, and the intra prediction mode of the above neighboring block of the current block is a Planar mode;
   the left neighboring block of the current block is not available, and the above neighboring block of the current block is not available; and
   the intra prediction mode of the left neighboring block of the current block is a Planar mode, and the above neighboring block of the current block is not available.

15. The method of claim 13, wherein when the MPM flag for the current block indicates that the intra prediction mode for the current block is in the set of MPMs and the MPM index for the current block is 0, the intra prediction mode for the current block is the Planar mode.

16. The method of claim 13, wherein the first offset is −4.

17. The method of claim 13, wherein the second offset is +4.

18. The method of claim 13, wherein reconstructing the current block using reference samples determined based on the intra prediction mode for the current block comprises:
   generating the reference samples by filtering samples in one or more neighboring blocks of the current block according to the intra prediction mode for the current block; and
   reconstructing the current block using the reference samples.

19. An encoder, comprising:
   one or more processors; and a non-transitory computer-readable storage medium coupled to the processors and storing programming for execution by the processors, wherein the programming, when executed by the processors, configures the encoder to:
   determine a set of MPMs for a current block of a video, wherein when at least one condition is satisfied, the set of MPMs comprise: a Planar mode, a DC mode, a Vertical mode, a Horizontal mode, an intra prediction mode corresponding to the Vertical mode with a first offset, and an intra prediction mode corresponding to the Vertical mode with a second offset;
   determine an intra prediction mode for the current block based on samples of the current block and samples of neighboring blocks of the current block;
   determine a value of a Most Probable Modes (MPMs) flag and an MPM index for the current block to indicate whether the intra prediction mode for the current block is in the set of MPMs; and
   encode the MPMs flag and the MPM index into a video bitstream of the video.

20. The encoder of claim 19, wherein the at least one condition comprises one of a plurality of conditions, the plurality of conditions comprising:
   an intra prediction mode of a left neighboring block of the current block is a Planar mode, and an intra prediction mode of an above neighboring block of the current block is a Planar mode;
   the intra prediction mode of the left neighboring block of the current block is a Planar mode, and the intra prediction mode of the above neighboring block of the current block is a DC mode;
   the left neighboring block of the current block is not available, and the intra prediction mode of the above neighboring block of the current block is a Planar mode;
   the left neighboring block of the current block is not available, and the above neighboring block of the current block is not available; and
   the intra prediction mode of the left neighboring block of the current block is a Planar mode, and the above neighboring block of the current block is not available.

* * * * *